United States Patent [19]
Kon et al.

[11] Patent Number: 6,136,444
[45] Date of Patent: *Oct. 24, 2000

[54] TRANSPARENT CONDUCTIVE SHEET

[75] Inventors: Tatsuichiro Kon; Satoshi Igarashi; Kazuo Yahata; Hiroyuki Fujishima; Yuji Tamura, all of Hino, Japan

[73] Assignee: Teijin Limited, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/595,581

[22] Filed: Feb. 1, 1996

[30] Foreign Application Priority Data

Feb. 2, 1995 [JP] Japan .................................. 7-015825
Feb. 2, 1995 [JP] Japan .................................. 7-015827

[51] Int. Cl.[7] .......................... G02F 1/1339; G02F 1/133
[52] U.S. Cl. .......................... 428/423.1; 428/1; 428/429; 428/447; 428/448; 428/522; 428/703; 349/122
[58] Field of Search ................................ 428/447, 412, 428/413, 416, 414, 450, 451, 500, 1, 429, 703, 423.1, 448, 522; 349/122

[56] References Cited

U.S. PATENT DOCUMENTS

| | | | |
|---|---|---|---|
| 4,387,133 | 6/1983 | Ichikawa et al. | 428/215 |
| 4,709,991 | 12/1987 | Hoshikawa | 428/1 |
| 4,752,549 | 6/1988 | Otsuka et al. | 430/58 |
| 4,802,742 | 2/1989 | Ichikawa et al. | 350/339 |
| 5,237,439 | 8/1993 | Misono et al. | 359/74 |
| 5,645,901 | 7/1997 | Fukuchi et al. | 428/1 |

FOREIGN PATENT DOCUMENTS

| | | |
|---|---|---|
| 0 526 232 A1 | 3/1988 | European Pat. Off. . |
| 0 649 047 A1 | 4/1995 | European Pat. Off. . |
| 0649047 | 4/1995 | European Pat. Off. . |
| 56-130010 | 10/1981 | Japan . |
| 61-41122 | 2/1986 | Japan . |
| 61-73924 | 4/1986 | Japan . |
| 63-71829 | 4/1988 | Japan . |
| 63-95942 | 4/1988 | Japan . |
| 3-9323 | 1/1991 | Japan . |
| 5-185568 | 7/1993 | Japan . |
| 6-136159 | 5/1994 | Japan . |
| 6-175143 | 6/1994 | Japan . |
| 6-234186 | 8/1994 | Japan . |

OTHER PUBLICATIONS

JP 06 148 431 (Abstract), Database WPI, Section Ch, Week 9426, Derwent Publications Ltd., May 27, 1994.

JP 04 299 109 (Abstract), Database WPI, Section Ch, Week 9249, Derwent Publications Ltd., Oct. 22, 1992.

*Primary Examiner*—Paul Thibodeau
*Assistant Examiner*—D. Lawrence Tarazano
*Attorney, Agent, or Firm*—Sughrue, Mion, Zinn, Macpeak & Seas, PLLC

[57] ABSTRACT

A transparent conductive sheet comprises a silicon oxide gas barrier layer, an organosilicon compound-containing solvent-resistant layer and a transparent conductive layer laminated in that order on one side of a transparent plastic substrate, or a polyvinyl alcohol-based resin gas barrier layer and a solvent-resistant layer laminated in that order, over an anchor coat layer.

20 Claims, 3 Drawing Sheets

TRANSPARENT CONDUCTIVE SHEET

BACKGROUND OF THE INVENTION

1. Field of the Invention

The present invention relates to a transparent conductive sheet, and more specifically it relates to a transparent conductive sheet made of a transparent plastic material, having such characteristics as excellent transparency, optical isotropy, surface smoothness, solvent resistance, interlayer adhesion and gas barrier properties, and especially low variation in gas barrier properties due to environmental humidity and low deterioration in adhesion with time, providing high display quality and reliability when used, for example, as a transparent electrode substrate for a liquid crystal display panel, and which may also be used as a transparent electrode substrate for an electroluminescence panel, electrochromic panel or the like.

2. Description of the Related Art

With the increasingly widening use in recent years of pocket-size, portable devices such as pagers, portable telephones, electronic notepads and pen-input devices, research in the field of liquid crystal display panels has resulted in the realization of liquid crystal display panels in some devices which employ plastics as substrates instead of thick, weighty and breakable glass substrates. Plastic liquid crystal substrates are lightweight, resistant to breakage, and allow more freedom of panel shape and curvature of displays.

However, the resistances to solvents including the resistance to aqueous alkali solution have not been investigated sufficiently.

When plastic substrates are used as liquid crystal display panel substrates, high performance is demanded in terms of transparency, optical isotropy, flatness, solvent resistance, interlayer adhesion and gas barrier properties.

That is, inferior transparency or optical isotropy of the substrate leads to problems such as lower brightness and contrast of the display, and coloration.

Also, low flatness of the substrate results in a non-uniform thickness of the liquid crystal layer, causing uneven orientation of the liquid crystals and thus lower display quality.

Solvent resistance is also an essential property during the step of manufacturing the liquid crystal panel, since deterioration of the appearance and flatness of the substrate is promoted as a result of low resistance to aqueous acidic solutions used for etching of the transparent conductive layer, aqueous alkali solutions used for the resist development, and organic solvents such as N-methylpyrrolidone and γ-butyrolactone used for formation of the liquid crystal aligning film.

Furthermore, low adhesion between the layers laminated on the substrate leads to peeling and cracking during production of the panel, and as the adhesion with time deteriorates, the long-term reliability of the panel is lowered.

Finally, when the gas barrier property of the substrate is poor, oxygen, nitrogen and water vapor seep in and out of the liquid crystal layer through the substrate, causing deterioration of the liquid crystals and generating air bubbles in the layer. For this reason, it is believed preferable for the gas barrier properties of substrates to be sufficiently high to provide a maximum oxygen permeability of 10 cc/m$^2$·day·atm under usual conditions, i.e., measuring conditions of 30° C., 50% RH, and a maximum water vapor permeability of 20 g/m$^2$·day·atm under usual conditions, i.e., measuring conditions of 40° C., 90% RH. However, it is preferable under severe conditions, for example, for use in a vehicle, to have a maximum oxygen permeability of 10 cm/m$^2$·day·atm at 30° C. and 90% RH and a maximum water vapor permeability of 10 g/m$_2$·day·atm at 40° C. and 90% RH.

In contrast, the oxygen permeability of a 100 μm-thick polycarbonate sheet, for example, is high at about 1200 cc/m$^2$·day·atm under measuring conditions of 30° C., 90% RH, and the water vapor permeability is also high at about 50 g/m$^2$·day·atm under measuring conditions of 40° C., 90% RH.

A plastic substrate is described in Japanese Unexamined Patent Publication No. 56-130010, and a plastic substrate developed for improved gas barrier properties is described in Japanese Unexamined Patent Publication No. 61-41122, No. 61-73924, No. 3-9323, etc.

As gas barrier layers for providing gas barrier properties, there have been proposed and employed layers made of organic-based materials such as polyvinyl alcohol-based resins, polyacrylonitrile, polyvinylidene chloride, etc. and layers of metal oxides such as silicon oxide.

Thus, when a plastic sheet is used as the substrate, a layer with an excellent gas barrier property must be provided. Such gas barrier layers which have been proposed include the aforementioned organic-based materials such as polyvinyl alcohol-based resins, polyacrylonitrile, polyvinylidene chloride, etc. and metal oxide layers made of silicon oxide or the like.

Gas barrier layers made of metal oxides, representative of which is silicon oxide, have gas barrier properties which are virtually unaffected by environmental humidity; however, because of their low scratch resistance and alkali resistance, they require the lamination of a layer with solvent resistance (hereunder referred to as "solvent-resistant layer"). To improve scratch resistance, the patent mentioned above has proposed lamination of a metal oxide layer and a cured resin layer, but not all the cured resin layer has a sufficient solvent resistance. Further, upon testing lamination of thermosetting epoxy resins and ultraviolet-curing acrylic resins, which have solvent resistance, on metal oxide layers, it was found that the adhesion was generally low and become insufficient, after durability testing.

On the other hand, polyvinyl alcohol-based resins such as polyvinyl alcohol or an olefin-vinyl alcohol copolymer are used for the gas barrier layer since they have a gas barrier property more excellent than a metal oxide layer under usual conditions of 50% RH or less.

However, plastic sheets used for applications which generally require optical isotropy, such as liquid crystal display panels, for example polyvinyl alcohol-based resins have poor adhesion with polycarbonate and carbonate copolymer sheets, and thus direct coating on such plastic sheets results in insufficient adhesion and proneness to peeling.

As a measure to solve these problems, the means described in Japanese Unexamined Patent Publication No. 63-71829 and No. 3-9323 has been applied, i.e. an anchor coat layer with good adhesion is provided on the plastic sheet, and then a polyvinyl alcohol-based resin layer is laminated over it.

The use of polyurethane resins, aqueous polyesters and the like as the aforementioned anchor coat layer is known. The anchor coat layer, however, is usually formed by a wet coating process, and since the compositions used for the above-mentioned known anchor coat layers are not quick-drying, the coating layer surface is sticky and cannot be quickly made into a tack-free, or non-adhesive state.

Consequently, when the anchor coat layer is further coated with a polyvinyl alcohol-based resin layer by a wet coating process, the coating surface cannot be prepared uniformly, which results in the problem of an uneven coating, and poor optical properties such as greater haze due to the rough interface. This problem is caused because the tacky surface is soft and prone to be roughen during the coating step.

In addition, because of this tackiness the film which has been laminated with the anchor coat layer also sticks to itself when it is wound into a roll, and such handling becomes impossible, making it more difficult to work with the film during the production process.

The present invention has been accomplished in light of such circumstances, and its object is that of providing a wide variety of transparent conductive sheets prepared with excellent transparency, optical isotropy, surface smoothness, solvent resistance and gas barrier properties, and particularly excellent adhesion between layers and durability, by laminating an intermediate layer with excellent adhesion and further a solvent-resistant layer with excellent durability and solvent resistance on a gas barrier layer of a metal oxide layer or a polyvinyl alcohol-based resin layer, and solvent resistance layer.

SUMMARY OF THE INVENTION

In order to achieve the above-mentioned objects, the present invention provides a transparent conductive sheet comprising at least a plastic substrate, a gas barrier layer of a metal oxide layer and/or a polyvinyl alcohol-based resin layer, a solvent-resistant layer, and a transparent electrically conductive layer, said transparent electrically conductive layer being an outermost layer on the solvent-resistant layer-disposed side of the plastic substrate, characterized in that on the outer surface of the metal oxide layer, if present, provided is an organic resin layer containing an organosilicon compound, and on the substrate-side of the polyvinyl alcohol-based resin layer, if present, provided is an anchor layer of a cured phenoxy-based resin layer.

In a preferred embodiment, the organic resin layer on the metal oxide layer may be a cured layer of a resin composition comprising a mixture of a first radiation curing resin and a hydrolysate of an alkoxysilane represented by the following general formula (1) and/or (2)

wherein $R^1$ is methyl or ethyl or a group containing a vinyl, acryloyl, methacryloyl, amino or epoxy group, and $R^2$ is methyl or ethyl.

In a preferred embodiment, the organosilicon compound-containing organic resin layer on the metal oxide layer may be made of a polymer produced by hydrolysis of an organosilicon compound represented by the following general formula (3)

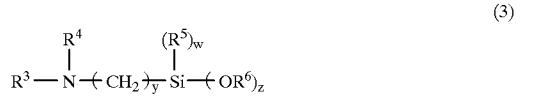

wherein $R^3$ is hydrogen, a phenyl group, an alkyl group of 1–4 carbon atoms or a group represented by the general formula (4)

in which x is an integer of 1–12, and $R^7$ and $R^8$ are each independently hydrogen or an alkyl group of 1–4 carbon atoms, $R^4$ is hydrogen or an alkyl group of 1–4 carbon atoms, $R^5$ and $R^6$ are each independently an alkyl group of 1–4 carbon atoms, y is an integer of 1–12, w is 0 or an integer of 1–2, z is an integer of 1–3, and w+z=3.

In a preferred embodiment, the phenoxy resin of the anchor coat layer may be a cured layer obtained by curing a thermal crosslinking resin consisting of a mixture of at least one type of phenoxy-based resin selected from phenoxy resins, phenoxy ether resins and phenoxy ester resins comprising repeating units represented by the following general formula (5)

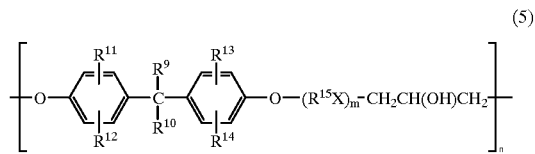

wherein $R^9$–$R^4$ may be the same or different and are hydrogen or an alkyl group of 1 to 3 carbon atoms, $R^{15}$ is an alkylene group of 2 to 5 carbon atoms, X is an ether or ester group, m is an integer of 0 to 3 and n is an integer of 20 to 300, and a polyfunctional isocyanate compound containing two or more isocyanate groups.

The gas barrier layer may be comprised of at least two layers of said metal oxide layer and the polyvinylalcohol-based resin layer.

The metal oxide layer and the polyvinylalcohol-based resin layer may be provided on the same side of said plastic substrate, the polyvinylalcohol-based resin layer being located on an outer side of the metal oxide layer.

In a preferred embodiment, the transparent conductive sheet may comprises a cured layer formed from a novolac-type epoxy-based curing resin or a silicone-based curing resin or a polyfunctional acrylate-containing radiation curable resin, as a solvent-resistant protective layer, on which a transparent conductive layer may be formed.

In this embodiment, the epoxy-based curing resin may be a novolac-type epoxy resin represented by the following general formula (6)

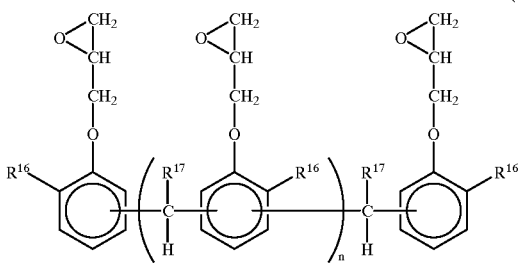

(6)

wherein $R^{16}$ is H or $CH_3$, $R^{17}$ is H or a glycidylphenyl ether group, and n is an integer of 1 to 50.

According to a preferred embodiment, the present invention provides a transparent conductive sheet with a first gas barrier layer, a first solvent-resistant layer and a transparent conductive layer laminated in that order on at least one side of a transparent plastic substrate, and with a second gas barrier layer and a second solvent-resistant layer laminated in that order on the other side of the substrate, wherein the first gas barrier layer is a silicon oxide layer, the first solvent-resistant layer is a cured layer of a resin composition comprising a mixture of a first radiation curing resin and a hydrolysate of an alkoxysilane represented by the following general formula (1) and/or (2)

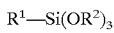
$R^1$—$Si(OR^2)_3$ (1)

$Si(OR^2)_4$ (2)

wherein $R^1$ is methyl or ethyl or a group containing a vinyl, acryloyl, methacryloyl, amino or epoxy group, and $R^2$ is methyl or ethyl, in a solid weight ratio of from 20:1 to 1:3, the second gas barrier layer is a polyvinyl alcohol-based resin, and there is provided, between the second gas barrier layer and the transparent plastic substrate, an anchor coat layer which is a cured layer obtained by curing a thermal crosslinking resin consisting a mixture of at least one type of phenoxy-based resin selected from phenoxy resins, phenoxy ether resins and phenoxy ester resins comprising repeating units represented by the following general formula (5)

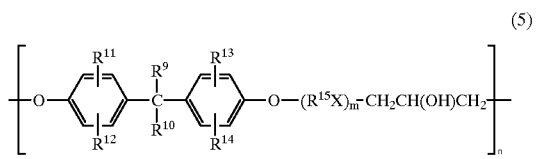

(5)

wherein $R^9$–$R^{14}$ may be the same or different and are hydrogen or an alkyl group of 1 to 3 carbon atoms, $R^{15}$ is an alkylene group of 2–5 carbon atoms, X is an ether or ester group, m is an integer of 0–3 and n is an integer of 20 to 300, with a polyfunctional isocyanate compound containing two or more isocyanate groups.

Furthermore, according to the present invention, there may also be provided a cured layer formed of a novolac-type epoxy-based curing resin or a silicone-based curing resin, a poly functional acrylate-containing radiation cured layer, as a solvent-resistant protective layer.

DETAILED DESCRIPTION OF THE INVENTION

Metal Oxide Gas Barrier Layer

Figure 1:
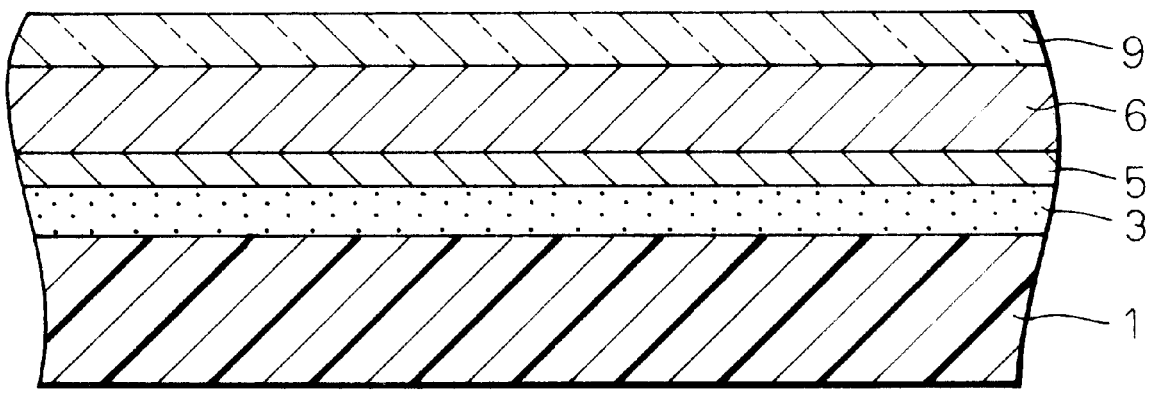
FIGS. 1 to 4 are cross-sectional views of various embodiments of transparent conductive sheets according to the invention.

When a metal oxide layer is used as the gas barrier layer of the invention, it may be made of silicon oxide, aluminum oxide, magnesium oxide, or the like, and it may be formed by a known method such as sputtering, vacuum vapor deposition, ion plating, plasma CVD, etc. Particularly preferred of these is silicon oxide with an average composition represented by $SiO_x$ where x is 1.5–2, formed to a film thickness of 5–100 nm, from the standpoint of productivity, optical properties, surface smoothness, mechanical characteristics, film stress and gas barrier properties. With film thicknesses of 5 nm or less, there were more pinholes in the prepared layer, to a point which virtually eliminated the gas barrier property. Also, when the layer thickness was greater than 100 nm, there were many cases in which the layer easily cracked upon bending, resulting in lower workability, inferior gas barrier properties and reduced transparency. Also, when silicon oxide is used, "x" in the average composition $SiO_x$ is preferably 1.5 or greater from the standpoint of transparency, since lower values resulted in poor transparency even at film thicknesses of, for example, about 5 nm, and it becomes difficult to obtain high light transmittance at a wavelength of 400 nm. The mechanical characteristics are also inferior. The transparency is preferably such that at a wavelength the light transmittance of 550 nm wavelength is 80% or greater and the haze value is 1% or less.

Organosilicon Compound-Containing Layer

According to an aspect of the present invention, when a metal oxide such as mentioned above is provided on the outermost layer, the scratch resistance and solvent resistance are inadequate as described earlier, and therefore a protective layer must be formed over the metal oxide layer.

Most laminated sheets are provided with high solvent resistance against organic solvents, in addition to, of course, scratch resistance, acid and alkali resistance, by using a wet coating process to laminate an organic resin such as a thermosetting phenoxy-based or epoxy-based resin or a radiation-curing resin.

However, it was found that there is often cissing crawling on the metal oxide layer during application of the coating solution, there being cases with absolutely no initial adhesion even when a film had been formed with no cissing crawing, and other cases where even when the initial adhesion was satisfactory, stable adhesion could not be maintained upon durability testing, especially upon moist heat durability testing at 60° C., 90% RH for 100 hours, with spontaneous peeling and rising of the laminated layer occurring in the worst cases. The durable adhesive properties required will differ considerably depending on the purpose and environment for using the lamination sheet, but such demands for durability are becoming more stringent, and for liquid crystal display panel electrodes more severe conditions are being employed. For example in cars during summer, the moist heat-durable adhesive properties must be such as to withstand 250 hours in an environment of 60° C., 90% RH.

The present inventors have conducted diligent research on adhesion of organic resin layers on metal oxides, from the point of view of satisfactory adhesion even upon moist heat durability testing, and as a result have found that satisfactory moist heat-durable adhesion may be obtained by forming at least a layer of a polymer produced by hydrolysis of an organosilicon compound represented by the following general formula (3)

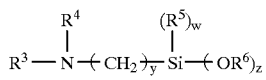

(3)

wherein $R^3$ is hydrogen, a phenyl group, an alkyl group of 1–4 carbon atoms or a group represented by the general formula (4)

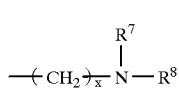

(4)

in which x is an integer of 1–12, and $R^7$ and $R^8$ are each independently hydrogen or an alkyl group of 1–4 carbon atoms,
$R^4$ is hydrogen or an alkyl group of 1–4 carbon atoms, $R^5$ and $R^6$ are each independently an alkyl group of 1–4 carbon atoms, y is an integer of 1–12, w is 0 or an integer of 1–2, z is an integer of 1–3, and w+z=3, as an anchor coat layer directly on the metal oxide layer.

The thickness of this anchor coat layer is preferably 10 to 100 nm, and more preferably 20 to 50 nm. At thicknesses of less than 10 nm, it became difficult to obtain a continuous thin layer, and at thicknesses greater than 100 nm, the optical transparency was lowered, and fragile breakage occurring in the film itself during adhesion evaluation testing demonstrated poorer, rather than improved, adhesion.

Also, it has been found that a laminated thereon radiation curing resin containing acryl isocyanate in an amount of 5–20 wt % as a solvent-resistant layer is satisfactory for the moist-heat durable adhesion.

Also, when the acryl isocyanate content in the radiation-curing resin was less than 5 wt %, adequate moist heat-durable adhesion could not be obtained under conditions of 60° C., 90% RH. Conversely, when the content exceeded 20 wt %, although adequate moist heat-durable adhesion was obtained, the resulting film had poor alkali resistance. Likewise, when a thermosetting resin such as a phenoxy or epoxy resin was used instead of a radiation-curing resin, it was still difficult to ensure adequate moist heat-durable adhesion. Radiation curing resins are also preferred from the standpoint of productivity, since they do not require subsequent thermal treatment to exhibit satisfactory solvent resistance, unlike thermosetting resins.

The radiation-curing resin used here is not particularly limited so long as it is a resin which cures by exposure to radiation such as ultraviolet rays, but it was found particularly preferable to use an acrylic-based curing resin containing, in terms of solid concentration after curing, at least 50 wt % of an aliphatic polyfunctional acrylic resin with 2 or more acryl groups per molecule, based on the total weight of the resin, because of its rapid curing speed and post-curing transparency exhibited even after durability testing.

This type of acrylic-based curing resin may be cured with ultraviolet rays upon addition of an appropriate amount of a known reaction initiator. Possible examples include acetophenone compounds such as diethoxyacetophenone, 2-methyl-1-{4-(methylthio)phenyl}-2-morpholinopropane, and 1-hydroxycyclohexylphenyl ketone; benzoin compounds such as benzoin and benzyldimethyl ketal; benzophenone compounds such as benzophenone and benzoylbenzoic acid; and thioxanthone compounds such as thioxanthone and 2,4-dichlorothioxanthone. An effect of even more greatly improved curability was exhibited by appropriate addition of the known accelerators such as triethanolamine, methyldiethanolamine and 4-dimethylaminobenzoic acid.

The acryl isocyanate is a compound represented by the following general formula (7), containing in the same molecule an acrylic group which is active to radiation, and an isocyanate group which reacts with reactive polyfunctional groups such as amino and hydroxyl groups.

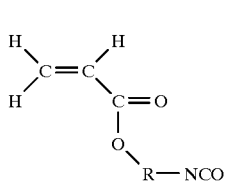

(7)

"R" in this formula is not particularly restricted, but a structurally simple alkylene group or alkylene oxide group is generally used for acryl isocyanates in various materials. Particularly preferred among these for use according to the present invention are those with 6 or less carbon atoms, in the case of alkylene groups, and 4 or less in the case of alkylene oxide groups, in order to avoid lowering the curing rate of the radiation-curing resin when an amount of the acryl isocyanate is added to exhibit sufficient moist heat-durable adhesion.

In this manner it is possible to produce a lamination sheet with scratch resistance, acid and alkali resistance and solvent resistance against organic solvents, which also has excellent moist heat-durable adhesion and a gas barrier property which does not depend on humidity.

Referring to FIG. 1, the transparent conductive sheet is constructed with a metal oxide gas barrier layer 3, an organosilicon compound-containing anchor coat layer 5, a solvent-resistant layer 6 and a transparent conductive layer 9 laminated in that order on one side of a transparent plastic substrate 1. The opposite side of the transparent plastic substrate 1 may be as shown, but when the transparent conductive sheet is to undergo treatment by immersion, at least a protective layer (solvent-resistant layer) may also be provided. Furthermore, the same laminate structure on the one side of the substrate may be laminated on the opposite side of the substrate.

According to another aspect of the present invention, in a transparent conductive sheet with a gas barrier layer, a solvent-resistant layer and optionally a transparent conductive layer laminated in that order on at least one side of a transparent plastic substrate, the gas barrier layer is a metal oxide layer, and the solvent-resistant layer is a cured layer of a resin composition comprising a mixture of a radiation curing resin with a prescribed degree of solvent-resistance after curing under prescribed conditions, and a hydrolysate of an alkoxysilane represented by general formula (1) and/or (2) shown above, in a solid weight ratio of from 20:1 to 1:3.

The solvent-resistant layer is preferably a resin composition comprising a mixture of a radiation-curing resin and an alkoxysilane hydrolysate. Here, the radiation-curing resin is the component required for obtaining excellent solvent resistance, and the alkoxysilane hydrolysate is the component required for obtaining high adhesion and durability on the metal oxide layer.

The radiation-curing resin for this purpose is a resin whose curing is promoted by exposure to radiation, such as ultraviolet rays or electron radiation, and specifically it refers to a resin containing an unsaturated double bond in the form of an acryloyl group, methacryloyl group, vinyl group, etc., within the molecule or structural unit. Among these, resins containing acryloyl groups are particularly preferred from the viewpoint of reactivity.

The radiation-curing resin to be used for the above aspect of the invention must have a prescribed degree of solvent resistance under prescribed curing conditions, as explained below. That is, a mixture prepared by adding 8 parts of the photoinitiator 2-hydroxy-2-methyl-1-phenylpropane-1-one (Darocure 1173, tradename of Merck Co.) to 100 parts by weight of a given radiation-curing resin, and diluted with an appropriate solvent if necessary, is coated onto a 100 μm-thick polycarbonate sheet to a dry layer thickness of 3 μm to form a resin layer. This is then exposed to ultraviolet rays using a 160 W/cm high-pressure mercury lamp at a cumulative light amount of 800 mJ/cm² to cure the resin layer. A few drops each of N-methylpyrrolidone, a 3.5 wt % aqueous sodium hydroxide solution and an etching solution (mixture of a 35 wt % aqueous ferric chloride solution, 35 wt % hydrochloric acid and water in a proportion of 1:1:10) are then dropped onto the resin layer and the layer is allowed to stand at 25° C. for 15 minutes, upon which the radiation-curing resin is judged to be solvent-resistant if no visual changes in appearance, such as cloudiness, swelling or dissolution, are observed.

These radiation-curing resins may be either simple compositions or mixtures of different ones, but from the standpoint of imparting solvent resistance, the resin composition preferably contains a polyfunctional acrylate component with 2 or more acryloyl groups in the molecule or structural unit.

When such a polyfunctional acrylate is used, however, problems of curls of the sheet sometimes occur when the solvent-resistant layer is cured, or after the heat treatment process for formation of the liquid crystal aligning film.

The curls referred to here represent a phenomenon which characteristically occurs when plastics are used as substrates, and indicate warpage of the lamination sheet. The degree of curling was evaluated by the following method. A 10 cm square was cut out of the lamination sheet and heated at 130° C. for 2 hours and then allowed to stand in an environment of 25° C., 50% RH for 3 days, after which it was positioned on a horizontal plane with the transparent conductive layer side facing downward, and the height of each of the four corners from the horizontal plane was measured, evaluating the average value as the positive curling value. In cases where the transparent conductive layer side was concave, the sheet was placed on the horizontal plane with the transparent conductive layer side facing upward, the height of each of the four corners from the horizontal plane was measured, and the measured values were averaged and evaluated as the negative curling value.

To obtain a liquid crystal display panel with high reliability, including workability in the production of the panel, the curling value of the lamination sheet as evaluated by the method described above is preferably no more than ±10 mm, and preferably no more than ±5 mm.

When dipentaerythritol hexacrylate or pentaerythritol tetraacrylate was used as the radiation-curing resin, extensive curling occurred immediately after curing, and when resin compositions containing dipentaerythritol pentaacrylate and caprolactone-modified dipentaerythritol hexaacrylate were used, such extensive curling occurred upon heat treatment that it could not be used. When, in order to suppress this curling, ethylene glycol or propylene glycol, for example, were introduced in the side chains of the acrylates, the solvent resistance was lowered so as to be inadequate.

As a result of studying radiation-curing resins with the desired solvent resistance and no curling after heat treatment during the process of producing the liquid crystal panel, we have found that this object may be achieved by using an acrylic-based resin represented by the following general formula (8)

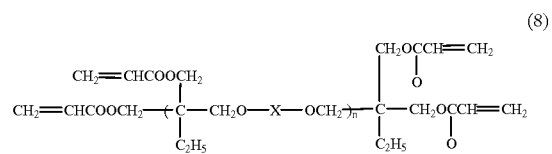

(8)

wherein X is a divalent group represented by

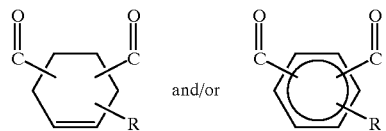

and/or in which R is hydrogen, a halogen or a methyl or ethyl group, and the average value of n is between 0.5 and 2, is used as the radiation-curing resin.

Here, the average polymerization number n is preferably in the range of 0.5–2. If the value of n is smaller than 0.5, more curling tends to occur when the resin is cured, and if the value of n is greater than 2, the viscosity of the acrylic resin increases, thus impairing the workability and also resulting in solubility problems when a solvent is used for dilution.

The alkoxysilane hydrolysate to be combined with the radiation-curing resin is preferably obtained by using a publicly known method for hydrolysis of an alkoxysilane represented by the following general formula (1) and/or (2):

(1)

(2)

wherein $R^1$ is methyl or ethyl or an organic group containing a vinyl, acryloyl, methacryloyl, amino or epoxy group, and $R^2$ is a methyl or ethyl group. Particularly preferred alkoxysilanes are vinyltrimethoxysilane, vinyltriethoxysilane, γ-acryloxypropyltrimethoxysilane, γ-methacryloxypropyltrimethoxysilane, methyltrimethoxysilane, methyltriethoxysilane, γ-aminopropyltriethoxysilane, γ-glycidoxypropyltrimethoxysilane, etc.

When the alkoxysilane is hydrolyzed, the alkoxy groups are converted into hydroxy groups. Thus, the hydrolysis converts the alkoxysilanes of general formulas (1) and (2) into silanols represented by the following general formulas (1') and (2')

(1')

(2')

The hydrolysis may be incomplete, with partial retention of the alkoxy groups. Also, if the silanols represented by the above general formulas (1') and (2') are already available, they may also be used.

The mixing ratio of the above-mentioned radiation-curing resin and the hydrolysate of an alkoxysilane represented by general formula (1)-(2) is preferably in the range of 20:1 to 1:3 in terms of solid weight ratio. When the mixing ratio is less than 20:1 the adhesion with the silicon oxide layer tends to be lower, and when the mixing ratio is greater than 1:3 there is a tendency toward lower solvent resistance and curability.

An appropriate alkoxysilane which has not been hydrolyzed may also be added to the above-mentioned resin composition. Since a portion of this added alkoxysilane is rapidly hydrolyzed when the resin composition is applied onto the sheet, due to moisture on the sheet and in the air, the same effect is exhibited as an alkoxysilane hydrolysate added beforehand to the resin composition, providing greater layer adhesion. Such alkoxysilanes which are particularly preferred for use include vinyltrimethoxysilane, γ-acryloxypropyltrimethoxysilane and γ-glycidoxypropyltrimethoxysilane. The amount thereof to be added is preferably less than 20% of the total solid weight. It is preferably not added in an amount of 20% or more, since this tends to result in lower solvent resistance of the layer, and especially lower aqueous alkali solution resistance.

These resin compositions may be wet-coated onto the metal oxide layer laminated on the plastic sheet. The wet coating process used may be a publicly known one, such as reverse roll coating, microgravure coating, direct gravure coating, kiss coating or die coating. The viscosity of the coating solution and the thickness of the layer may be adjusted by dilution of the resin composition with an appropriate organic solvent.

The curing of the layer may be accomplished by exposure to radiation, such as by ultraviolet curing or electron radiation curing. For greater denseness of the layer, it is even more preferable for the curing to be performed after evaporation of the solvent component contained in the coated layer. When ultraviolet curing is employed, an appropriate amount of a before-mentioned photoreaction initiator is added to the resin composition.

No deterioration in adhesion was found in the above-mentioned solvent-resistant layer, obviously at the initial stage just after lamination on the silicon oxide layer, and even after durability testing for 250 hours and longer under moist heat conditions of 60° C., 90% RH and dry heat conditions of 90° C. It also had adequate solvent resistance against aqueous acidic solutions used for etching of the transparent conductive layer, aqueous alkali solutions used for development of the resist, and organic solvents, such as N-methylpyrrolidone, used for formation of the liquid crystal aligning layer, and the solvent resistance was judged to be excellent. Consequently, the transparent conductive sheet of the invention is suitable for use as a transparent conductive sheet for a liquid crystal panel.

Figure 2:
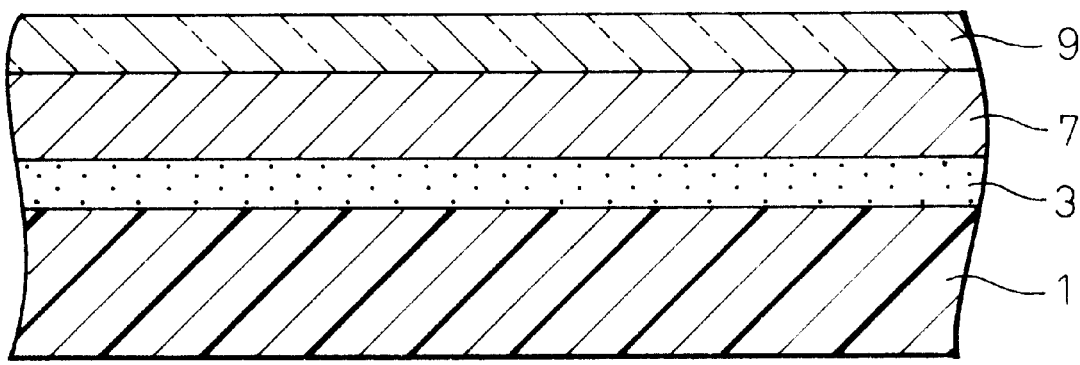

Referring to FIG. 2, the transparent conductive sheet is constructed with a metal oxide, particularly silicon oxide, gas barrier layer 3, an organosilicon compound-containing solvent-resistant layer 7 and a transparent conductive layer 9 laminated in that order on a transparent plastic substrate 1. The opposite side of the transparent plastic substrate 1 may be as shown, but a protective layer (solvent-resistant layer) may also be provided. Alternatively, the laminated constructions shown in FIG. 1 and FIG. 2 may be also be provided on the opposite side.

The above organosilicon compound-containing layer may be used for the organosilicon compound layer in FIG. 1 since it is excellent in adhesion with a metal oxide layer.

Anchor Coat for Polyvinyl Alcohol-Based Resin Gas Barrier Layer

According to an aspect of the present invention, the polyvinyl alcohol-based resin layer is laminated on the transparent plastic substrate via an anchor coat layer, and the anchor coat layer is a cured layer obtained by curing a thermal crosslinking resin comprising a mixture of at least one type of phenoxy-based resin selected from phenoxy resins, phenoxy ether resins and phenoxy ester resins comprising repeating units represented by the general formula (5), and a polyfunctional isocyanate compound containing two or more isocyanate groups.

This aspect of the invention was arrived at upon the finding that the above-mentioned thermal crosslinking resin has sufficient optical characteristics and adhesion, and quick-drying properties such that a sufficiently tack-free surface may be obtained upon continuous application/drying, and specifically a tack-free surface may be obtained with heat treatment for 15 minutes or less, and if necessary even 5 minutes or less, at a temperature below the glass transition point of the plastic film, as indicated in the examples.

Any publicly known resin may be used as the polyvinyl alcohol-based resin, specific ones being polymer resins containing 50 mole percent or more of at least one selected from vinyl alcohol components and vinyl alcohol copolymer components. The vinyl alcohol copolymer component may be a vinyl alcohol-vinyl acetate copolymer, a vinyl alcohol-vinyl butyral copolymer, an ethylene-vinyl alcohol copolymer, or a crosslinked product thereof.

As mentioned above, the thermal crosslinking resin of the present invention is a mixture of a phenoxy-based resin and a polyfunctional isocyanate compound.

The phenoxy-based resin is at least one type of phenoxy-based resin selected from phenoxy resins, phenoxy ether resins and phenoxy ester resins comprising repeating units represented by the following general formula (5)

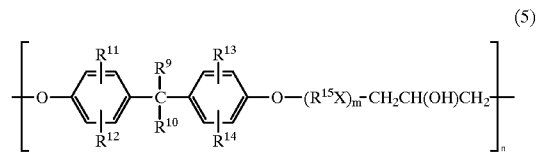

wherein $R^9-R^{14}$ may be the same or different and are hydrogen or an alkyl group of 1 to 3 carbon atoms, $R^{15}$ is an alkylene group of 2–5 carbon atoms, X is an ether or ester group, m is an integer of 0–3 and n is an integer of 20 to 300: particularly preferred of these from the standpoint of ease of synthesis and cost is one in which $R^9$ and $R^{10}$ are methyl, $R^{11}$, $R^{12}$, $R^{13}$, $R^{14}$ are hydrogen, and $R^{15}$ is pentylene.

As mentioned above, the polyfunctional isocyanate compound is one which contains 2 or more isocyanate groups, examples of which are the following.

Polyisocyanates of 2,6-tolylene diisocyanate, 2,4-tolylene diisocyanate, tolylene diisocyanate-trimethylolpropane adduct, t-cyclohexane-1,4-diisocyanate, m-phenylene diisocyanate, p-phenylene diisocyanate, hexamethylene diisocyanate, 1,3,6-hexamethylene triisocyanate, isophorone diisocyanate, 1,5-naphthalene diisocyanate, tolidine diisocyanate, xylylene diisocyanate, hydrogenizedxylylene diisocyanate, diphenylmethane-4,4'-diisocyanate, hydrogenizediphenylmethane-4,4'-diisocyanate, lysine diisocyanate, lysine ester triisocyanate, triphenylmethane triisocyanate, tris(isocyanatephenyl)thiophosphate, m-tetramethylxylylene diisocyanate, p-tetramethylxylylene diisocyanate, 1,6,11-undecane triisocyanate, 1,8-diisocyanate-4-isocyanate methyloctane, bicycloheptane triisocyanate, 2,2,4-trimethylhexamethylene diisocyanate and 2,4,4-trimethylhexamethylene diisocyanate, as well as mixtures thereof, or their addition products with polyhydric alcohols.

Particularly preferred among these, from the standpoint of general utility and reactivity, are 2,6-tolylene diisocyanate, 2,4-tolylene diisocyanate, tolylene diisocyanate-trimethylolpropane adduct, and hexamethylene diisocyanate.

The thermal crosslinking resin may be obtained by mixing the above-mentioned phenoxy-based resin with the polyfunctional isocyanate compound. They may be dissolved in a solvent which satisfactorily dissolves them both, such as methyl ethyl ketone, methyl isobutyl ketone, cellosolve acetate or ethyl acetate, and mixed to prepare a thermal crosslinking resin solution suitable for application. Then, the thermal crosslinking resin solution may be coated onto the plastic substrate by wet coating and cured by heat treatment, to obtain a plastic substrate covered with a tack-free anchor coat layer which provides good adhesion with the polyvinyl alcohol-based resin.

It is essential that the thermal crosslinking resin be a mixture in which the phenoxy-based resin and the polyfunctional isocyanate compound are simultaneously present, because if only a phenoxy resin is used, the adhesion with the polyvinyl alcohol-based resin will be poor, resulting in easier peeling. On the other hand, if only a polyfunctional isocyanate compound is used, the resultant anchor coat layer will not readily crosslink or polymerize and thus will become fragile and remain wet, and the anchor coat layer will be prone to break even when the polyvinyl alcohol-based resin layer is laminated over it, making it difficult to laminate the polyvinyl alcohol-based resin layer with a uniform thickness and good optical characteristics.

The composition ratio of the phenoxy-based resin and the polyfunctional isocyanate compound in the thermal crosslinking resin is preferably in the range of 0.2 to 3 in terms of the value of the isocyanate mole number in the polyfunctional isocyanate compound divided by the hydroxy mole number in the phenoxy-based resin, "NCO/OH", from the standpoint of adhesion with the polyvinyl alcohol-based resin layer and of tackiness of the resultant anchor coat layer surface.

Thermal crosslinking resins having compositions with "NCO/OH" outside of this range contain an excess of either the phenoxy-based resin or the polyfunctional isocyanate compound and thus, as mentioned earlier, they exhibit inferior performance when used as anchor coat layers. The boundary value of "NCO/OH", restriction for avoiding drastic reduction in adhesion is 0.2 or 3.

The lamination sheet, wherein the polyvinyl alcohol-based resin layer is laminated on the plastic sheet via the anchor coat layer, may be produced in the following manner. That is, it may be produced by coating the aforementioned plastic sheet with the thermal crosslinking resin, thermosetting the coated layer until it is tack-free to form the anchor coat layer, and then forming the polyvinyl alcohol-based resin layer by a wet coating process.

The wet coating process referred to here is a means of laminating the sheet surface with a laminate of uniform thickness by applying and drying the liquid laminate uniformly in a sheet-like manner, and it specifically refers to spin coating, Mayer coating, forward revolving roll coating, gravure roll coating, reverse roll coating, etc.

Methods of laminating functional layers on the sheets also include dipping and direct lamination of thin films. However, such methods are not applied here because with dipping it is difficult to coat large surfaces with a uniform thickness in a controlled manner, while with direct lamination it is difficult to include a solvent in the lamination adhesive layer, which adds a further problem in that the material of the functional layer, e.g. the polyvinyl alcohol-based resin layer, must be formed on a sheet with satisfactory mechanical characteristics.

The before-mentioned production process allows stable formation of a polyvinyl alcohol-based resin layer on the anchor coat layer, with a uniform film thickness and consistent optical characteristics. That is, since the surface of the anchor coat layer is tack-free and its surface quality is not disturbed by lamination of the polyvinyl alcohol-based resin layer by wet coating, the polyvinyl alcohol-based resin layer may be formed with a uniform film thickness and consistent optical characteristics, and thus the resultant laminated sheet has excellent gas permeation resistance and consistent optical characteristics, as well as adequate adhesion with the plastic sheet substrate.

A specific construction for the production process of the invention is a process in which the anchor coat layer is formed by wet coating/thermal setting, after which, since the anchor coat layer is tack free, the laminated sheet is then wound on a roll or folded onto itself, and the polyvinyl alcohol-based resin layer is wet coated in the same manner and dried. This allows the production to be easily accomplished using even a simple coating apparatus, possibly lowering equipment costs if both layers can be formed with the same apparatus.

The anchor coat layer and the polyvinyl alcohol-based resin layer may also be formed by a continuous production process using an apparatus which can perform continuous wet coating-dry coating-wet coating-dry coating, and this allows a higher level of productivity.

In any case, it is preferred to employ a highly-productive "roll-to-roll" production system in which a layer is formed on the plastic sheet while rewinding the plastic sheet from a roll of the long plastic sheet, and then the sheet is wound back onto the roll. In other words, since a tack-free anchor coat layer may be obtained by continuous application/thermosetting while rewinding from the plastic sheet roll, the sheet may be wound up on a roll after forming the polyvinyl alcohol-based resin layer directly after the thermosetting, or alternatively, the sheet may be wound on the roll after the thermosetting and may be carried until the step of forming the polyvinyl alcohol-based resin layer. The process may be allowed to be adaptive to the existing layout of the plant. Therefore, a "roll-to-roll" production system is able to be applied and higher productivity process of manufacturing becomes possible.

Furthermore, the protective layer and transparent conductive layer may also be formed by this roll-to-roll production system, thus allowing laminated films having these layers in various layered structures to be produced by a process which is highly productive throughout.

Thus, this aspect of the present invention overcomes the problem arising from the presence of tackiness when conventional anchor coat layers are laminated by wet coating processes, and realizes highly productive manufacturing of a lamination sheet provided with a polyvinyl alcohol-based resin layer as a gas barrier layer, which has consistent optical characteristics and good adhesion with the plastic substrate. It is possible, therefore, to provide transparent conductive lamination sheets with long-term high reliability, which may be suitably used as transparent electrode substrates for liquid crystal display panels and the like.

Figure 3:
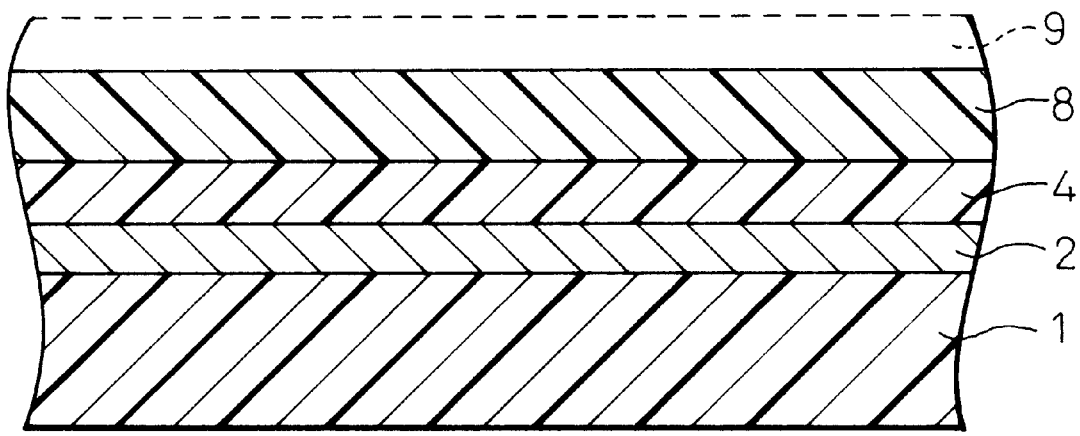

Referring to FIG. 3, the transparent conductive sheet is constructed with an anchor coat layer 2, a gas barrier layer 4 made of a polyvinyl alcohol-based resin, an organic solvent-resistant layer (protective layer) 8 and a transparent conductive layer 9 laminated in that order on a transparent plastic substrate 1. The opposite side of the transparent plastic substrate 1 may be as shown, or a protective layer (solvent-resistant layer) may also be provided.

Solvent-Resistant Protective Layer

The transparent conductive sheet of the present invention is also provided with a protective layer on the gas barrier layer, especially on the polyvinyl alcohol-based resin layer, for the purpose of improving the moisture and solvent resistance.

The protective layer may be a cured thermal crosslinking resin such as epoxy resins, phenoxy resins, phenoxy ether resins, phenoxy ester resins, acryl resins, melamine resins, phenol resins, urethane resins, radiation curing resins and so on.

It has been found that it is preferred that the protective layer be a cured layer made from a novolac-type epoxy-based curing resin or a silicone-based resin or a specific radiation curable resin mentioned before and later.

The present inventors have found that novolac-type epoxy-based curing resins, silicone-based curing resins or the before-mentioned radiation curable resins form layers upon curing which have sufficiently high solvent resistance for simultaneous organic solvent resistance, alkali resistance and etching solution resistance, while also having sufficient optical characteristics.

Novolac-type epoxy resins represented by the following structural formula (6) are preferred in terms of solvent-resistance

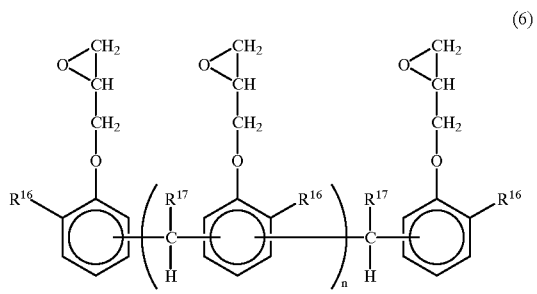

(6)

wherein $R^{16}$ is H or $CH_3$, $R^{17}$ is H or a glycidylphenyl ether group, and n is an integer of 1 to 50. Since n generally has a distribution, a single number cannot be specified, but its average value is preferably large, with 3 or more, and particularly 5 or more, being preferred.

The curing agent used for curing of the above-mentioned epoxy resin may be any publicly known one. Examples of curing agents which may be used include amines, polyaminoamides, acids and acid anhydrides, imidazoles, mercaptan, phenol resins and so on.

Among these, from the standpoint of solvent resistance, optical characteristics and thermal characteristics, the curing agent used for curing of the above-mentioned novolac-type epoxy resin is preferably an acid anhydride or alicyclic amine, and more preferably an acid anhydride. Acid anhydrides which may be used include alicyclic acid anhydrides such as methylhexahydrophthalic anhydride and methyltetrahydrophthalic anhydride; aromatic acid anhydrides such as phthalic anhydride; and aliphatic acid anhydrides such as dodecenylsuccinic anhydride, of which methylhexahydrophthalic anhydride is preferred. Alicyclic amines include bis(4-amino-3-methyldicyclohexyl)methane, diaminodicyclohexylmethane and isophoronediamine, of which bis(4-amino-3-methyldicyclohexyl)methane is preferred.

When an acid anhydride is used as the curing agent, an appropriate amount of a publicly known curing catalyst such as a tertiary amine or imidazole, is preferably added for a higher reaction rate.

The method for forming the epoxy resin layer may be a wet coating process such as Mayer coating, gravure roll coating or spin coating, or alternatively dip coating, lamination coating or the like, but wet coating is preferred from the standpoint of easier control of a uniform thickness. A solvent may also be used for dilution to adjust the pot life and viscosity of the epoxy resin. The solvent may be any one which thoroughly dissolves the epoxy, such as a ketone, ether or ester, and it is added in an appropriate amount for the intended purpose.

The coated epoxy resin layer is cured by heat treatment at a temperature below the glass transition temperature of the polymer substrate, to form a cured resin layer which is solvent-resistant.

The thickness of the epoxy-based cured resin layer is preferably between 0.1 $\mu$m and 30 $\mu$m, and more preferably between 0.3 $\mu$m and 20 $\mu$m. If it is less than 0.1 $\mu$m, its effect as a solvent-resistant layer will be insufficient, while if it is greater than 30 $\mu$m the flexibility will be insufficient for the requirements of working and assembly, and thus neither case is practical.

When high level adhesion is required between the gas barrier layer and the protective epoxy-based curing resin layer, an anchor coat may also be provided between these layers if necessary. This anchor coat layer is preferably made of a so-called silane coupling agent such as γ-aminopropyltrimethoxysilane or γ-glycidoxypropyltrimethyoxysilane, or an isocyanate such as a tolylene diisocyanate-trimethylolpropane adduct, of which isocyanates are most preferred. The isocyanate may be used alone or as a mixture with a phenoxy resin, phenoxy ether resin, polyol or acryl polyol.

The adhesion of the protective layer comprising this epoxy-based curing resin may be improved by mixing the epoxy-based curing resin with a so-called silane coupling agent such as γ-aminopropyltrimethoxysilane or γ-glycidoxypropyltrimethyoxysilane prior to the coating step, so that the anchor coat layer may be omitted.

Any of a variety of publicly known silicon-based resins may be used as the silicon-based curing resin, but those containing at least 40 wt % of trialkoxysilane are preferred. When trialkoxysilane is present at less than 40 wt %, the resulting layer with a higher tetraalkoxysilane content will be too hard and prone to cracking, resulting in poor flexibility. Higher dialkoxysilane and monoalkoxysilane contents do not sufficiently provide the desired solvent resistance.

Trialkoxysilanes include methyltrimethoxysilane, ethyltrimethoxysilane, vinyltrimethoxysilane, γ-methacryloxypropyltrimethoxysilane, β-(3,4-epoxycyclohexyl)ethyltrimethoxysilane, γ-glycidoxypropyltrimethoxysilane, γ-aminopropyltrimethoxysilane, N-β-(aminoethyl)-γ-aminopropyltrimethoxysilane, γ-mercaptopropyltrimethoxysilane, etc. Other components may be tetraalkoxysilane, dialkoxysilane, monoalkoxysilane, colloidal silica, and the like. The tetraalkoxysilane may be methyl silicate, ethyl silicate, propyl silicate, etc. The dialkoxysilane may be dimethyldimethoxysilane, dimethyldiethoxysilane, diethyldimethoxysilane, etc. The monoalkoxysilane may be trimethylmethoxysilane, etc.

An acrylic resin, polyurethane resin, epoxy resin, melamine resin, polyvinyl alcohol resin or urea resin may also be added to the silicon-based curing resin for improvement of the adhesion, so long as the transparency is not impaired.

To accelerate curing of the silicone-based curing resin containing 40% or more of a trialkoxysilane, an aqueous acidic solution of hydrochloric acid or acetic acid is preferably also added. The composition may also be diluted with a volatile solvent, which may be an alcohol, ester, ether, ketone or a mixture thereof.

The method for forming the silicon-based curing resin layer may be a wet coating method such as Mayer coating, gravure roll coating or spin coating, or dip coating, lamination coating or the like, but wet coating is preferred from the standpoint of forming a uniform thickness.

The coated silicon-based curing resin layer is cured by heat treatment at a temperature below the glass transition temperature of the polymer film substrate, to form a cured resin layer which is solvent-resistant.

The thickness of the silicon-based curing resin layer is preferably between 0.1 $\mu$m and 20 $\mu$m, and more preferably between 0.2 $\mu$m and 15 $\mu$m, in terms of post-curing thickness. If it is less than 0.1 $\mu$m, its effect as a solvent-resistant protective layer will be insufficient, while if it is greater than 20 $\mu$m the flexibility will be insufficient for the requirements of working and assembly, and thus neither case is practical.

When powerful adhesive strength is required between the plastic substrate and the silicon-based curing resin layer, the silicon-based curing resin layer is preferably coated after first forming an anchor coat layer on the plastic substrate. This anchor coat layer may be formed of an acrylic-based resin by a wet coating process.

The radiation-curing resin used here is not particularly limited so long as it is a resin which cures by exposure to radiation such as ultraviolet rays, but it was found particularly preferable to use said radiation curing resin mixed with a hydrosate of said alkoxy silane and an acrylic-based curing resin containing, in terms of solid concentration after curing, at least 50 wt % of an aliphatic polyfunctional acrylic resin with 2 or more acryl groups per molecule, based on the total weight of the resin, because of its rapid curing speed and post-curing transparency exhibited even after durability testing.

The preferable thickness of this radiation curable resin layer is 2 to 6 $\mu$m after curing from viewpoints of excellent solvent resistance and curl involved in shrinkage upon curing.

Transparent Plastic Substrate

The plastic substrate used for the present invention may be any publicly known plastic sheet made of polyester, polycarbonate, polyacrylate, polysulfone, polyethersulfone, or the like. When it is to be used as a transparent electrode substrate for a liquid crystal display panel or the like, it is preferably an optically isotropic sheet with an optical isotropy represented by a retardation value of 20 nm or less, and with a light transmittance of 80% or greater at the wavelength of 550 nm and a haze value of 1% or less. It is usually preferable that the transparent plastic substrate or sheet has a thickness of 70 to 200 $\mu$m.

If the retardation value is greater than 20 nm, it will cause coloration especially when used as a liquid crystal display element. On the other hand, if the light transmittance is less than 80%, there will be insufficient transparency to function as an electrode substrate for displays.

Plastic substrates may generally be obtained by either melt extrusion wherein the starting polymer material is melted by heat and extruded from a die to form a sheet, or solution casting wherein the polymer material is dissolved in a solvent and then cast onto a support and heated to evaporate the solvent and form a sheet, but solution casting is preferably used in order to achieve the aforementioned retardation. With melt extrusion, it is not only difficult to obtain sheets with low retardation, but die lines, gel products and fish-eyes tend to be created in the sheet, making it difficult to obtain a sheet with consistent optical characteristics over a wide surface area.

Furthermore, the polymer material used for the optically isotropic plastic substrate mentioned above is most preferably a polycarbonate or polyallylate, from the standpoint of optical and thermal characteristics.

The polycarbonate contains, as its main component, 2,2-bis(4-hydroxyphenyl)propane, and it may also contain a copolymer component for improved optical characteristics and heat resistance.

Particularly preferred, from the standpoint of heat resistance and mechanical characteristics, are polycarbonates of average molecular weight 30,000 or higher and a glass transition temperature of at least 150° C., comprising a bisphenol component consisting entirely of bisphenol A.

The copolymer component may be, for example, bis(4-oxyphenyl)methane, 1,1-bis(4-oxyphenyl)ethane, 1,1-bis(4-oxyphenyl)butane, 2,2-bis(4-oxyphenyl)butane, 1,1-cyclohexylene, 9,9-bis(4-hydroxyphenyl)fluorene, 1,1-bis(4-hydroxyphenyl)-3,3,5-trimethylcyclohexane, etc.

With a polycarbonate substrate prepared by solution casting, it is possible to obtain excellent optical isotropy represented by a retardation value of 20 nm or lower and a slow axis deviation of no more than ±15 degrees. It is also possible to obtain very excellent surface smoothness, demonstrated by a surface roughness Ra of 1 nm or less on the side of the sheet which contacts the air during formation of the sheet (hereunder referred to as the "air side"), and a surface roughness Ra of a only few nm on the side of the sheet which contacts the supporting belt during formation of the sheet (hereunder referred to as the "belt side").

The value of the surface roughness Ra is the value of center line average roughness when measured using a WYKO Co. TOPO-3D, which is based on the measuring principle of the phase shift interference method, wherein a section of 256 $\mu$m square on the sheet is scanned with intervals of 1 $\mu$m at a magnification of 40×.

The polyallylate contains a 2,2-bis(4-hydroxyphenyl) propane component as its main diol component, and terephthalic acid and isophthalic acid as its main dicarboxylic acid components.

As mentioned above, these sheets are preferably formed by employing the aforementioned solution casting process wherein the polycarbonate or polyallylate is dissolved in a solvent and then cast onto a support. The solvent used for formation of these sheets may be any one which basically dissolves polycarbonates or polyallylates, but methylene chloride is preferred. The concentration of the polymer in the sheet-forming solution is preferably between 6 wt % and 30 wt %. If it exceeds 30 wt %, the dissolution will be non-uniform and the solution will have poor pot life, while if it is less than 6 wt %, the effective viscosity will be too low, and thus neither is practical.

Transparent Conductive Layer

The transparent conductive layer laminated on the solvent-resistant layer is generally a publicly known one, for example a layer of a metal such as tin, indium, zinc, etc. or an oxide thereof, and it may be formed by a publicly known means such as sputtering, vacuum vapor deposition, or the like.

Among these transparent conductive layers is preferred an oxide consisting mainly of amorphous indium oxide, containing 5–15 wt % of tin as a component (also called as indium-tin oxide; ITO) and having a film thickness in the range of 20 to 200 nm, from the standpoint of transparency, conductivity and flexibility of the layer.

That is, although highly crystalline indium oxide layers have higher transparency and conductivity than amorphous ones, their lack of flexibility is a problem, and especially when a crystalline layer is formed on a plastic substrate, the substrate becomes prone to cracking upon bending, and thus has poorer reliability and handle ability.

The crystallinity/amorphism of the indium oxide or indium-tin oxide layer is defined as follows. Amorphism is defined as a 20% or lower relative area of microcrystals with a maximum size of about 100 nm interspersed on the surface of the amorphous substance, when the surface of the formed indium oxide film is viewed at any section of 100 nm square under a transmission electron microscope.

Indium oxide or indium-tin oxide is essentially a transparent electrical insulator, but it becomes a semiconductor when it contains trace impurities or has a slight oxygen deficiency. Preferred semiconductor metal oxides include indium oxides with tin or fluorine impurities, and indium oxide layers containing 5–15 wt % of tin are particularly preferred because they have good conductivity while maintaining high transparency.

The layer thickness is preferably in a range of 20 to 200 nm. If it is thinner than 20 nm, the conductivity as a transparent conductive layer will be insufficient, and if it is thicker than 200 nm poorer transparency and flexibility will result.

Furthermore, since smoothness and surface quality are particularly important for display elements, such as STN (supper twisted nematic), in which the liquid crystal orientation has a notable effect on the display, specifically the surface roughness of the transparent conductive layer as an electrode substrate for liquid crystal panels, in terms of the Ra value, is preferably no more than 40 nm, and more preferably no more than 20 nm.

Preferred Transparent Conductive Sheet (1)

The following transparent conductive sheet is provided as a preferred example according to the present invention. That is, this transparent conductive sheet has a first gas barrier layer, a first solvent-resistant layer and a transparent conductive layer laminated in that order on at least one side of a transparent plastic substrate, and a second gas barrier layer and a second solvent-resistant layer laminated in that order on the other side of the substrate, wherein the first gas barrier layer is a silicon oxide layer, the first solvent-resistant layer is a cured layer of a resin composition comprising a mixture of a first radiation curing resin and a hydrolysate of an alkoxysilane represented by the following general formula (1) and/or (2)

(1)

(2)

wherein $R^1$ is methyl or ethyl or a group containing a vinyl, acryloyl, methacryloyl, amino or epoxy group, and $R^2$ is methyl or ethyl, in a solid weight ratio of from 20:1 to 1:3, the second gas barrier layer is a polyvinyl alcohol-based resin layer, and there is provided, between the second gas barrier layer and the transparent plastic substrate, an anchor coat layer which is a cured layer obtained by curing a thermal crosslinking resin consisting of a mixture of at least one type of phenoxy-based resin selected from phenoxy resins, phenoxy ether resins and phenoxy ester resins comprising repeating units represented by the following general formula (5)

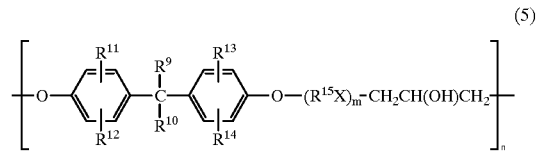

wherein $R^9$–$R^{14}$ may be the same or different and are hydrogen or an alkyl group of 1 to 3 carbon atoms, $R^{15}$ is an alkylene group of 2–5 carbon atoms, X is an ether or ester group, m is an integer of 0–3 and n is an integer of 20 to 300, with a polyfunctional isocyanate compound containing two or more isocyanate groups.

The aforementioned second solvent-resistant layer may be a cured layer formed from the above-mentioned novolac-type epoxy-based curing resin from the above-mentioned a silicone-based resin or from the above-mentioned radiation curable resin.

Figure 4:
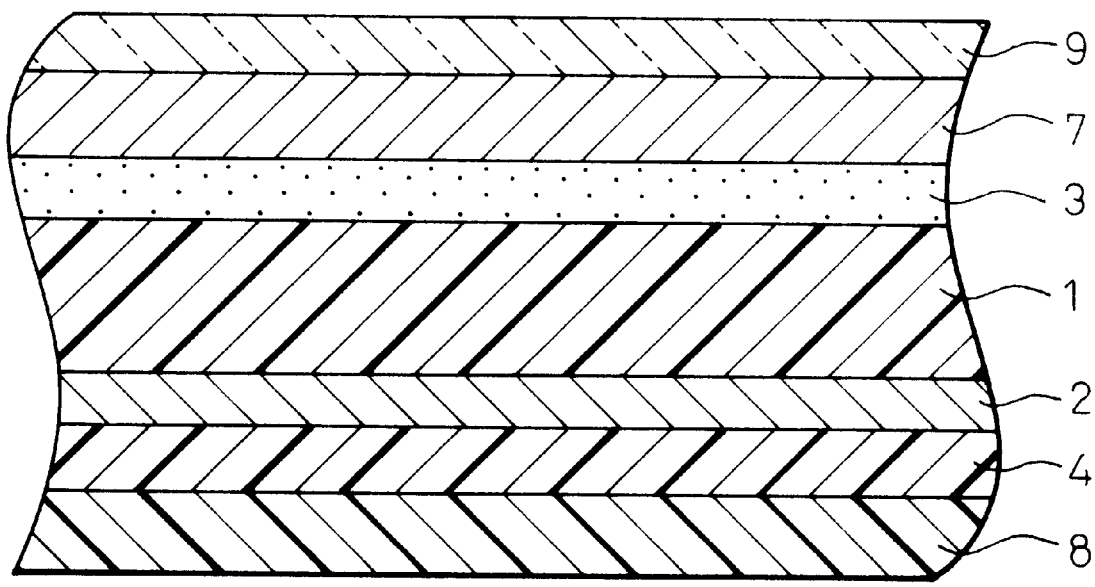

Referring to FIG. 4, a preferred transparent conductive sheet according to the invention is constructed with a silicon oxide gas barrier layer 3, an organosilicon compound-containing solvent-resistant layer 7 and a transparent conductive layer 9 laminated in that order on one side of a transparent plastic substrate 1, and an anchor coat layer 2, a polyvinyl alcohol-based resin gas barrier layer 4 and a solvent-resistant layer 8 laminated in that order on the other side.

Preferred Transparent Conductive Sheet (2)

Another preferred transparent conductive sheet according to the invention is a transparent conductive film prepared by forming a transparent conductive layer on one outermost layer of a laminated plastic substrate, on at least one side of which is provided a metal oxide layer either directly or via at least one anchor coat layer, and at least one organic resin protective layer is laminated on the metal oxide layer using a wet coating process, wherein at least one of the laminated layers other than the outermost layer contains a polyvinyl alcohol-based resin layer, the phenoxy-based curing resin used in the preferred transparent conductive sheet is provided under the polyvinyl alcohol-based resin layer, at least one anchor coat layer is formed between the metal oxide layer and the resin protective layer using a wet coating process, the anchor coat directly above the metal oxide layer is a polymer produced by hydrolysis of an organosilicon compound represented by the following general formula (3)

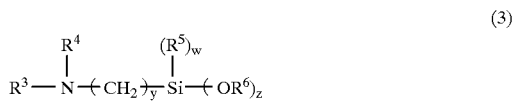

(3)

wherein $R^3$ is hydrogen, a phenyl group, an alkyl group of 1–4 carbon atoms or a group represented by the general formula (4)

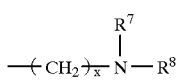

(4)

in which x is an integer of 1–12, and $R^7$ and $R^8$ are each independently hydrogen or an alkyl group of 1–4 carbon atoms, $R^4$ is hydrogen or an alkyl group of 1–4 carbon atoms, $R^5$ and $R^6$ are each independently an alkyl group of 1–4 carbon atoms, y is an integer of 1–12, w is 0 or an integer of 1–2, z is an integer of 1–3, and w÷z=3, and under the transparent conductive layer and the outermost layer on the opposite side are each independently formed a phenoxy-based cured resin layer, an epoxy-based cured resin layer, a silicon-based cured resin layer or a radiation cured resin layer.

A transparent conductive sheet exhibiting satisfactory properties may be obtained by the combination of laminate materials mentioned above; however, in order to further reduce cracking of the metal oxide film upon bending, transparent conductive sheet constructions with the following lamination orders were found to be preferred.

In other words, representing the polymer substrate as (1), the metal oxide layer as (2), the anchor coat layer directly on the metal oxide layer as (3), the polyvinyl alcohol-based resin layer as (4), the layer under the polyvinyl alcohol-based resin layer as (5), the layer under the transparent conductive layer as (6), the outermost layer opposite the transparent conductive layer as (7), the transparent conductive layer as (8), and points between layers where at least one anchor coat layer may be inserted as //, constructions wherein the metal oxide layer was formed as close to the center as possible were most appropriate, as in the following construction orders:

(8)/(6)//(3)/(2)//(1)/(5)/(4)/(7)
(8)/(6)//(4)/(5)/(1)//(2)/(3)//(7)
(8)/(6)//(4)/(5)//(3)/(2)//(1)/(7)
(8)/(6)/(1)//(2)/(3)//(5)/(4)/(7)
(8)/(6)//(3)/(2)//(1)//(2)/(3)//(5)/(4)/(7)
(8)/(6)//(4)/(5)//(3)/(2)//(1)//(2)/(3)//(7)
(8)/(6)//(4)/(5)//(3)/(2)//(1)//(2)/(3)//(5)/(4)/(7)

Thus, according to this preferred embodiment, there is provided a highly reliable transparent conductive sheet which has satisfactory transparency, optical isotropy, gas barrier properties, adhesion between layers, especially reliable adhesion, solvent resistance, and smoothness and surface quality of the conductive side, and which, when used as a transparent electrode for a display panel such as a liquid crystal display panel, exhibits excellent display quality which does not deteriorate even after undergoing mechanical, thermal and chemical influences.

Liquid Crystal Display Element Construction Examples

Figure 5:
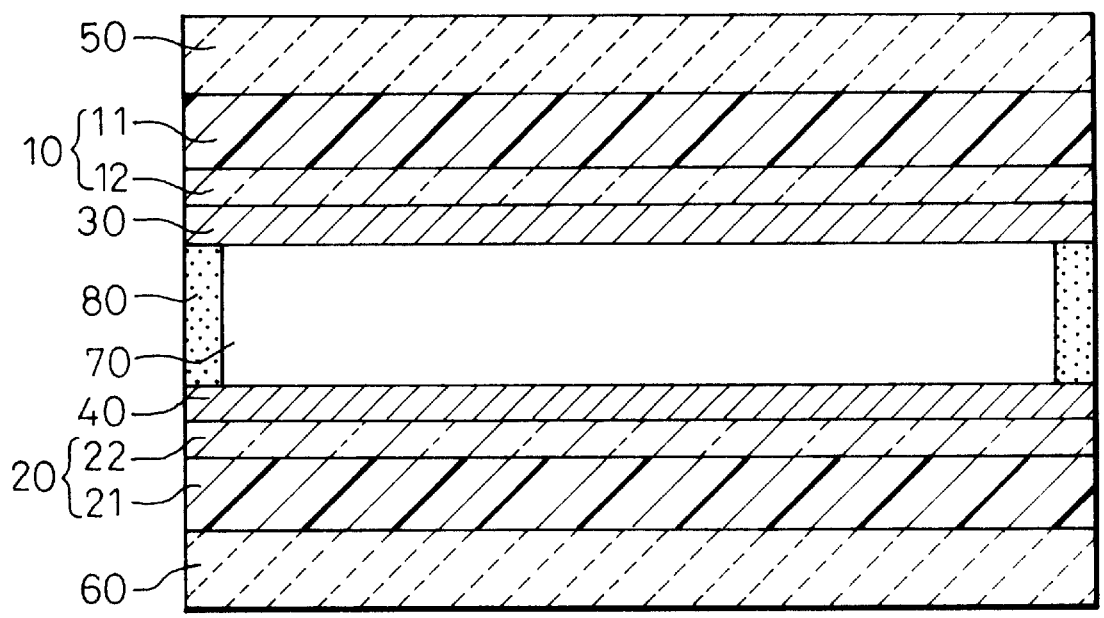
FIG. 5 is a cross-sectional view showing an example of the construction of a liquid crystal display panel.

FIG. 5 shows an example of a liquid crystal display element employing a transparent conductive sheet according to the invention. Here, 10 and 20 are two independent transparent conductive sheets, between which a liquid crystal layer 70 is sandwiched at constant spacing. The constant spacing is maintained by situating fine particles in the liquid crystal layer, or by providing protrusions. In the two transparent conductive sheets, 11 and 21 are base sheets, and 12 and 22 are transparent conductive layers to serve as electrodes for application of a voltage to the liquid crystal layer. Thus, the transparent conductive sheet is made so that the transparent conductive layers face each other on the inside.

Aligning films 30, 40 are formed on the transparent conductive layer side of each of the transparent conductive sheets to align the liquid crystals. The aligning film is formed by dissolving a commonly used polyamide acid which can be imidated at low temperature, in n-methylpyrrolidone as the solvent, cast coating the solution by spin coating or the like, and then volatilizing the solvent by heat treatment at 140° C. for 2 hours and subsequently imidating the polyamide acid. Alternatively, unidirectional rubbing treatment can also give the aligning film the ability to align liquid crystals.

The liquid crystal layer is fluid. Consequently, after the liquid crystal layer has been sandwiched between the transparent conductive sheets, the outer areas of the liquid crystal layer around the panel edges may be sealed with a sealing material 80 to hold the liquid crystal layer in the panel.

When this type of liquid crystal element is used as a display element, if the display mode is a widely used twisted nematic liquid crystal or super twisted nematic liquid crystal display mode, a display may be produced by placement of polarizing plates 50, 60 on the outsides of the transparent conductive sheet. Alternatively, if the mode is a guest-host mode in which a dichroic dye is dispersed in the liquid crystal layer, or a polymer dispersed liquid crystal mode in which the liquid crystal phase is dispersed in a polymer, it may function as a display element without the use of a polarizing plate.

EXAMPLES

Evaluation of each of the tests performed for the following examples and comparative examples was made based on the following guidelines, unless otherwise specified in the examples.

(1) Solvent Resistance

Evaluation of the solvent resistance included the organic solvent resistance, alkali solution resistance and acid solution resistance. The evaluating conditions were set in accordance with the conditions of a liquid crystal display panel electrode substrate which is believed to undergo the most severe conditions among the main potential uses of this laminated film.

(1-1) Organic solvent resistance

To determine the organic solvent resistance, a few drops of N-methylpyrrolidone, a typical solvent for liquid crystal aligning film precursor materials, are dropped onto the surface of the sample on the side on which the solvent-resistant layer has been formed, and the layer is allowed to stand at 25° C. for 3 minutes or 10 minutes, upon which any changes in appearance such as cloudiness, swelling or dissolution are visually observed, and it was judged to be solvent-resistant if no changes were found.

(1-2) Alkali solution resistance

The alkali solution resistance was determined by immersing the sample in a 3.5 wt % aqueous sodium hydroxide solution, used for dissolving resists after patterning, at 25° C. for 10 minutes, washing it thoroughly with running water and then drying it and visually observing the appearance, and it was judged to be solvent-resistant if no changes were found.

(1-3) Acid solution resistance

The acid solution resistance was determined by immersing the transparent electrode layer in an etching solution (35 wt % aqueous ferric chloride solution, 35 wt % hydrochloric acid and water mixed at a weight ratio of 1:1:10) used for patterning, at 25° C. for 10 minutes, washing it thoroughly with running water and then drying it and visually observing the appearance, and it was judged to be solvent-resistant if no changes were found.

(2) Gas Barrier Property

The gas barrier property was evaluated by measuring the permeabilities of oxygen and water vapor, and the gas barrier property was judged to be excellent when the oxygen permeability was 10 cc/m$^2$·day·atm or less, and the water vapor permeability was 20 g/m$^2$·day·atm or less.

(2-1) Oxygen permeability

The oxygen permeability was measured using a unit Oxytran 2/20 ML sold by MOCON Corp., under a low humidity environment of 30° C., 50% RH and a high humidity environment of 30° C., 90% RH.

(2-2) Water vapor permeability

The water vapor permeability was measured using a unit Permatran W1A sold by MOCON, under humidified conditions of 40° C., 90% RH. During measurement of the water vapor permeability, the measuring sample was positioned so that the side of the film opposite the transparent electrode layer was facing the humidifying side.

(3) Light Transmittance

The light transmittance was determined by measuring the transmittance with parallel rays using a publicly known visible spectrophotometer. The haze value was measured using a unit COH-300A sold by Nihon Denshoku Industries.

(4) Adhesion

The moist heat durable adhesion was evaluated by allowing the laminated film and the transparent conductive sheet to stand in an atmosphere of 60° C., 90% RH, and checking the adhesion at given intervals. The adhesion was checked by a tessellate test (tessellated tape method) conducted according to JIS standard K5400, in terms of the persistence of cells without peeling, and the adhesion was judged to be satisfactory when the persistence was 100%.

(5) Scratch Resistance

The scratch resistance was evaluated by rubbing the laminated film surface 10 times with #0000 steel wool which had been subjected to a load of 0.1 kg per square centimeter and then determining the number of scratches per centimeter of width in the direction of rubbing with the steel wool, and the scratch resistance was judged to be satisfactory when less than 5 scratches/centimeter were produced.

(6) Tackiness

The tackiness was evaluated in the following manner. That is, it was evaluated either by touch, or by pasting together two anchor coat layers or an anchor coat layer and another plastic film, and determining whether the adhesive state was maintained.

(7) Retardation Value and Slow Axis

The retardation value is the known product Δn d of the birefringent refractive index difference Δn and the film thickness d, and although the measuring value must be at a wavelength in the range of visible light, a measuring value of 590 nm is used as the representative value since most plastics have wavelength dispersion characteristics of refractive index.

The retardation value and slow axis were measured at ten arbitrary points of a sample.

(8) Average Composition of Silicon Oxide

The ratio of oxygen to silicon in the silicon oxide layer was measured by a publicly known technique such as X-ray photoelectron spectroscopy, X-ray microspectroscopy, Auger electron spectroscopy, or the like.

Example 1

A polycarbonate resin with an average molecular weight of 37,000, of which the bisphenol component consisted solely of bisphenol A, was used to form a polycarbonate sheet by solution casting in the following manner.

The polycarbonate resin was dissolved in a methylene chloride solvent to a concentration of 20 wt %, and the resulting solution was cast onto a 175 μm-thick polyester sheet by die coating to form a plastic sheet. After a drying step in which the solvent was vaporized off until the residual solvent concentration reached 13 wt %, the polycarbonate sheet was released from the polyester sheet. The resultant polycarbonate sheet was then placed in a drying oven at a temperature of 120° C. and dried to a residual solvent concentration of 0.08 wt % while balancing the lengthwise and widthwise tension.

The thus obtained sheet had a thickness of 102 μm. The surface roughness Ra was 0.5 nm on the air side and 2.1 nm on the belt side. The retardation value was 8±2 nm in the direction of the axis and the slow axis was within ±8 degrees from the MD direction as the center.

A silicon oxide (SiO$_x$) layer was formed to a thickness of 50 nm as a metal oxide layer on the air side of the polycarbonate sheet, by thermal vapor deposition of SiO fragments in a vacuum of 6.7 mPa. The value of x in this case was 1.7.

The solvent-resistant layer on the belt-side of the substrate was a phenoxy-based curing resin layer with a thickness of 8 μm after curing. Specifically it was formed by using a Mayer bar to coat a mixture of 40 parts of Phenotohto YP-50 manufactured by Tohto Chemical, KK. as the phenoxy resin, 40 parts of methyl ethyl ketone and 20 parts of 2-ethoxyethyl acetate, with 40 parts of the isocyanate curing agent compound A3 (solid concentration: 75 wt %, diluted with methyl ethyl ketone) manufactured by Takeda Yakuhin Kogyo, KK., and heating it at 80° C. for 5 minutes and then at 130° C. for 15 minutes.

On the metal oxide layer on the air side of the substrate. This metal oxide layer was then coated was a solution consisting of a mixture of 1.4 parts of an average pentamer conjugate organosilicon compound produced by hydrolysis of the compound represented by the chemical formula (9)

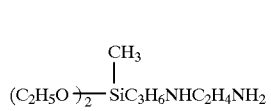

(9)

48.6 parts of butanol and 50 parts of isopropanol, using a bar coater, and allowed to dry at 120° C. for 1 minute. The post-drying film thickness was 50 nm. A 4 μm radiation curing resin layer was formed over this layer. The radiation curing resin used was an ultraviolet curing resin containing acrylisocyanate, and specifically the resin layer was formed by using a Mayer bar to coat a solution consisting of a mixture of 82 parts of an acrylic acid ester of polypentaerythritol as the main component, 8 parts of acrylisocyanate (product of Okamura Petroleum Refining Co., KK.), 12 parts of tetrahydrofurfuryl acrylate (THF-A, product of Kyoei Chemical Co., KK.) as a reactive diluent, 6 parts of 1-hydroxycyclohexylphenyl ketone (Irgacure 184, product of Ciba-Geigy, KK.) as a photoinitiator and 0.1 part of silicone oil (SH28PA, product of Toray-Dow Corning Silicone, KK.) as a levelling agent, and a 160 W/cm high-pressure mercury lamp was used for ultraviolet curing with a cumulative light amount of 700 mJ/cm$^2$.

The light transmittance of the laminated sheet obtained in this manner was 88% at a wavelength of 550 nm and 82% at a wavelength of 400 nm. The haze value was 0.4%. The retardation value measured at 10 arbitrary points on the sheet was 8±2 nm, and the slow axis was within ±8 degrees with the MD direction as the center. The surface roughness Ra was 4.0 nm on the air side and 8.3 nm on the belt side.

The oxygen permeability of this laminated sheet was 3 cc/m$^2$·day·atm at 30° C., 50% RH and 3 cc/m$^2$·day·atm at 30° C., 90% RH. The water vapor permeability was 3 g/m$^2$·day·atm at 40° C., 90% RH. No changes were found in the sheet during evaluation of the solvent resistance. In the moist heat durability test, there were no apparent changes even after 500 hours had passed, and there was absolutely no peeling between the layers. The scratch resistance was also satisfactory.

Next, an indium-tin oxide layer was formed by sputtering on the air side of the laminated sheet, as a transparent conductive layer. The sputtering target used was an indium-tin oxide target with a composition of indium/tin=90/10 in terms of weight ratio and a packing density of 90%. The sheet was set in a sputtering apparatus which was then evacuated to a pressure of 1.3 mPa, and then an Ar/O$_2$ gas with a volume mixing ratio of 98.5/1.5 was introduced to adjust the atmosphere pressure to 0.27 Pa. The sheet temperature was set to 50° C., and DC sputtering was performed at a making current density of 1 W/cm$^2$.

The resultant transparent conductive layer had a 0% relative area of resident crystal grains, and was thus amorphous. The film thickness was 130 nm, and the surface resistance value was 40 Ω/□.

The light transmittance of the transparent conductive sheet obtained in this manner was 84% at a wavelength of 550 nm. The haze value was 0.7%. The transparent conductive layer surface had an Ra of 4.1 nm.

When this transparent conductive sheet was further subjected to moist heat durability testing for 250 hours at 60° C., 90% RH, there were no apparent changes, and there was no peeling between the layers upon adhesion testing on both sides.

Therefore, the prepared transparent conductive sheet had satisfactory transparency, optical isotropy, gas barrier properties, adhesion between layers, solvent resistance, and surface smoothness and surface quality of the conductive side.

Thus was obtained a transparent plastic sheet with a high transparency, optical isotropic property, adhesion between gas barrier property, layers, solvent resistance, and surface smoothness and flatness of the conductive layer.

Example 2

On the air side of the polycarbonate sheet identical to that used in Example 1, a silicon oxide layer of SiO$_x$ 50 nm thick was deposited as a metal oxide layer by thermally evaporating SiO fragments in a vacuum of 6.7 mPa. Here, x in SiO$_x$ was about 1.7.

On the belt side of the polycarbonate sheet there were then formed a 2 μm-thick anchor layer, a 5 μm-thick polyvinylalcohol-based resin layer and an 8 μm-thick solvent-resistant layer as an outermost layer in the following manner. The thickness mentioned above are those after curing.

The anchor coat layer was a phenoxy-based curing resin layer, and specifically 20 parts of a phenoxy resin (Phenotohto YP-50, product of Tohto Chemical, KK.) was mixed with 50 parts of methyl ethyl ketone and 30 parts of 2-ethoxyethyl acetate as solvents, and then 20 parts of the isocyanate curing agent A3 (solid concentration: 75 wt %), product of Takeda Yakuhin Kogyo, KK., was mixed therewith to form a solution which was then coated onto the surface of the polycarbonate using a Mayer bar, and this was heated at 130° C. for 5 minutes to form a phenoxy-based resin cured layer, in which NCO/OH ratio was 1.0.

The gas barrier layer was a polyvinyl alcohol resin-based layer, and specifically, a Mayer bar was used to coat a heated mixture of 10 parts of polyvinyl alcohol (PVA-117, product of Kuraray, KK.) and 90 parts of water on the anchor coat layer, and this was heat treated at 130° C. for 30 minutes to form a 5 μm layer.

The solvent-resistant layer was a phenoxy-based curing resin layer, and specifically, 40 parts of a phenoxy resin (Pheno Tohto YP-50, product of Tohto Chemical, KK.) was mixed with 40 parts of methyl ethyl ketone and 20 parts of 2-ethoxyethyl acetate as solvents, and then 40 parts of the isocyanate curing agent A3 (solid concentration: 75 wt %), product of Takeda Yakuhin Kogyo, KK., was mixed with the solution which was then coated onto the gas barrier layer using a Mayer bar, and this was heat treated at 80° C. for 5 minutes and 130° C. for 15 minutes to form an 8 μm layer.

On the metal oxide layer previously formed on the air side formed was the same anchor coat layer as the anchor coat layer for the metal oxide layer in Example 1.

Further on the above anchor coat layer formed was a phenoxy-based cured resin layer 8 μm thick after curing as the solvent-resistant layer of the outermost layer. Specifically, a solution having the same composition as used for the outermost solvent-resistant layer on the belt side was coated using a Mayer bar and then heat treated at 80° C. for 5 minutes and then at 130° C. for 3 hours.

The various properties of the thus obtained laminated sheet were evaluated to have light transmittance of 88% at wavelength of 550 nm and 82% at wavelength of 400 nm, a haze value of 0.4%, and a retardation value and a slow axis deviation of ±8 degree with the MD direction as the center, measured at arbitrary 10 points of 8±2 nm. The surface roughness Ra was 5.7 nm on the air side and 33 nm on the belt side.

The oxygen permeability of this transparent conductive sheet was 0.05 cc/m$^2$·day·atm at 30° C., 50% RH and 3 cc/m$^2$·day·atm at 30° C., 90% RH. The water vapor permeability was 2 g/m$^2$·day·atm at 40° C., 90% RH. No changes were found in the sheet during evaluation of the solvent resistance including the etching resistance, the alkali resistance and the organic solvent resistance. Also, the adhesion test was carried out for both sides of the laminated sheet and no release was seen.

Subsequently, a transparent conductive layer as in Example 1 was formed on the air side of the laminated sheet. The resultant transparent conductive layer had a 0% relative area of resident crystal grains, and was thus amorphous. The layer thickness was 130 nm, and the surface resistance value was 40 Ω/□.

The thus obtained transparent conductive sheet had a light transmittance of 84% at wavelength of 550 nm. The haze value was 0.7%. The surface roughness Ra of the transparent conductive layer was 5.7 nm.

After durability test kept at 60° and 90% RH for 250 hours, the transparent conductive sheet had no changes in appearance and the adhesion test for both sides of the sheet resulted in no release.

Thus, there was obtained a transparent conductive sheet with excellent transparency, optical isotropy, gas barrier properties, solvent resistance, adhesion between layers, and surface smoothness and flatness of conductive layer.

Example 3

On the belt side of a polycarbonate sheet as in Example 1 formed was a silicon oxide layer of SiO$_x$ wherein x was about 1.6 with a thickness of 20 nm as a metal oxide layer by evaporating SiO fragments in a vacuum of 6.7 mPa.

On the metal oxide layer formed was a first anchor coat layer of a silicon compound as in Example 1, on which formed was a second anchor coat layer 0.5 μm thick of a phenoxy-based cured resin having the same composition as that of the anchor coat layer for the polyvinyl alcohol-based resin layer in Example 2.

On the second anchor layer formed was a radiation cured resin layer 4μm thick after curing, as a solvent-resistant layer of the outermost layer, in the following manner. The radiation curable resin used was an ultra-violet curable resin. Specifically, a solution of a mixture comprised of 8 parts by weight of acrylic ester of polypentaerythritol as a primary component, 12 parts by weight of tetrahydrofurylacrylate (THF-A, product of Kyoei Yushi K.K.) as a reaction diluent, 6 parts by weight of 1-hydroxycyclohexylphenyl ketone (Irgacure-184, product of Chiba Geigy, K.K.) as a photoinitiator and 0.1 parts by weight of a silicone oil (SH28PA, product of Toray-Dow Corning Silicone K.K.) as a leveling agent, was coated using a Mayer bar and a 160 W/cm high pressure mercury lamp was used for ultraviolet curing with a cumulative light amount of 700 mJ/cm$^2$.

On the air side of the laminated sheet opposite to the above lamination, a third anchor layer 1 μm thick, a polyvinyl alcohol-based resin layer 3 μm thick, a fourth anchor coat layer 1 μm thick, and an outermost solvent-resistant layer 4 μm thick were laminated in this order.

The third and fourth anchor layers are of the same phenoxy-based cured resin as that of the anchor coat layer for the polyvinyl alcohol-based resin layer in Example 2. The composition of the polyvinyl alcohol-based resin layer in this Example was also the same as in Example 2. The outermost solvent-resistant layer was of the same resin as that of the outermost radiation cured resin layer formed on the belt side in this Example.

In this lamination construction, the time periods for forming respective layers are very short and the productivity was high.

The various properties of the thus manufactured laminated sheet were evaluated to have light transmittances of 89% at wavelength of 550 nm and 84% at wavelength of 400 nm, a haze value of 0.4%, and a retardation value of 8±2 nm and a slow axis deviation of ±8 degrees as the MD direction as the center, the retardation value and the slow axis dispersion being measured at arbitrary 10 points. The surface roughness Ra of the laminated sheet was 8.8 nm on the air side and 12 nm on the belt side.

The oxygen permeability of this transparent conductive sheet was 0.09 cc/m$^2$·day·atm at 30° C., 50% RH and 5 cc/m$^2$·day·atm at 30° C., 90% RH. The water vapor permeability was 5 g/m$^2$·day·atm. No changes were observed in the solvent resistance test including tests for resistances to etching solution, alkali and organic solvent. Further, no release was seen in the adhesion test on both sides of the laminated sheet.

Subsequently, a transparent conductive layer as in Example 1 was formed on the air side of the laminated sheet. The resultant transparent conductive layer had a 0% relative area of resident crystal grains, and was thus amorphous. The layer thickness was 130 nm, and the surface resistance value was 40 Ω/□.

The thus obtained transparent conductive sheet had a light transmittance of 84% at wavelength of 550 nm. The haze value was 0.7%. The surface roughness Ra of the transparent conductive layer was 8.9 nm.

After durability test kept at 60° and 90% RH for 250 hours, the transparent conductive sheet had no changes in appearance and the adhesion test for both sides of the sheet resulted in no release.

It was possible to obtain a transparent conductive sheet excellent in transparency, optical isotropic property, gas barrier property, adhesion between layers and surface smoothness and flatness of conductive layer at a high productivity.

Example 4

Polyallylate U-100, product of Unitika, Ltd. was dissolved in methylene chloride to form a 25% by weight solution. This solution was casted on a support of a polyester sheet 175 μm thick by die coating method. The coated polyallylate sheet was dried in a drying oven to a remaining solvent concentration of 15% by weight and released from the polyester sheet. The polyallylate sheet was dried in a drying oven at a temperature of 120° C. while balancing the tensions in the longitudinal and traverse directions until the remaining solvent concentration reached 0.08% by weight.

The obtained sheet had a thickness of 101 μm and surface roughnesses Ra of 0.7 nm on the air side and 2.6 nm on the belt side. The retardation value was 11±3 nm. The slow axis was within ±9 degrees with the MD direction as the center.

On the belt side of the polyallylate sheet formed was a metal oxide layer in the same manner as in Example 1, on which an anchor coat layer of the same silicon compound as in Example 1 was formed to a 25 nm thickness.

Further, on the silicon compound anchor layer, there were formed an anchor layer 2 μm thick, a polyvinyl alcohol-based resin layer 5 μm thick, and an outermost solvent-resistant layer 5 μm thick in the same manner as in Example 2.

On the air side of the sheet formed was an outermost solvent-resistant layer of an epoxy-based cured resin 7 μm thick. Specifically, 100 parts of an epoxy resin ECON-104S, product of Nihon Kayaku K.K., was mixed with 150 parts of methylisobutyl ketone as a solvent, 50 parts of methylhexahydro phthalic acid unhydrate as an acid unhydrate curing agent, and 5 parts of 1,8-diazabicyclo(5,4,0)undecene-1 as a catalyst, and the solution of the mixture was coated by Mayer bar and heat treated at 135° C. for 30 minutes.

The various properties of the thus obtained laminated sheet were evaluated to have light transmittances of 88% at a wavelength of 550 nm and 82% at a wavelength of 400 nm, a haze value of 0.4%, and a retardation value of 11±3 nm and a slow axis deviation of ±9 degrees with the MD direction as the center, measured at 10 arbitrary points. The surface roughness Ra of the sheet was 3.8 nm on the air side and 35 nm on the belt side.

The oxygen permeability of this transparent conductive sheet was 0.05 cc/m$^2$·day·atm at 30° C., 50% RH and 3 cc/m$^2$·day·atm at 30° C., 90% RH. The water vapor permeability was 2 g/m$^2$·day·atm. No changes were observed in the solvent resistance test including tests for resistances to etching, alkali and organic solvent. Further, no release was seen in the adhesion test on both sides of the laminated sheet.

On the air side of the laminated sheet, a transparent conductive layer was formed in the same manner as in Example 1 to obtain a transparent conductive sheet.

The thus obtained transparent conductive sheet had a light transmittance of 85% at wavelength of 550 nm. The haze value was 0.7%. The surface roughness Ra of the transparent conductive layer was 3.8 nm.

After durability test kept at 60° and 90% RH for 100 hours, the transparent conductive sheet had no changes in appearance and the adhesion test for both sides of the sheet resulted in no release.

As shown above, it was possible to obtain a transparent conductive sheet excellent in transparency, optical isotropic property, gas barrier property, adhesion between layers and surface smoothness and flatness of conductive layer at a high productivity.

Example 5

On the air side of a polyallylate sheet as in Example 4 formed was a silicon oxide layer of $SiO_x$ wherein x was about 1.7 with a thickness of 15 nm as a metal oxide layer by evaporating SiO fragments in a vacuum of 6.7 mPa.

On the other hand, on the belt side of the polyallylate sheet formed was an outermost solvent-resistant layer, which was the same as the phenoxy-based cured resin solvent-resistant layer formed on the polyvinyl alcohol-based resin layer in Example 2 in the same manner as in Example 2.

On the metal oxide layer formed were as a first anchor layer the same silicon compound layer as in Example 4, on which formed were a second anchor layer 1 µm thick, a polyvinyl alcohol-based resin layer and an outermost solvent-resistant layer 5 µm thick.

The second anchor layer was the same as the phenoxy-based resin anchor coat layer in Example 4, the composition of the polyvinyl alcohol-based resin layer was the same as in Example 4, and the outermost solvent-resistant layer was the same as the outermost solvent-resistant layer of the air side in Example 2.

The various properties of the thus manufactured laminated sheet were evaluated to have light transmittances of 90% at wavelength of 550 nm and 88% at wavelength of 400 nm, a haze value of 0.4%, a retardation value of 11±3 nm and a slow axis deviation of ±9 degrees as the MD direction as the center, measured at arbitrary 10 points. The surface roughness Ra of the laminated sheet was 7.9 nm on the air side and 9.2 nm on the belt side.

The oxygen permeability of this transparent conductive sheet was 0.14 $cc/m^2$·day·atm at 30° C., 50% RH and 7 $cc/m^2$·day·atm at 30° C., 90% RH. The water vapor permeability was 8 $g/m^2$·day·atm. No changes were observed in the solvent resistance test including tests for resistances to etching, alkali and organic solvent. Further, no release was seen in the adhesion test on both sides of the laminated sheet.

A transparent conductive sheet was prepared by forming a transparent conductive layer as in Example 1 on the air side of the above laminated sheet.

The thus obtained transparent conductive sheet had a light transmittance of 85% at a wavelength of 550 nm. The haze value was 0.7%. The surface roughness Ra of the transparent conductive layer was 7.9 nm. After durability test kept at 60° and 90% RH for 250 hours, the transparent conductive sheet had no changes in appearance and the adhesion test for both sides of the sheet resulted in no release.

It was possible to obtain a transparent conductive sheet excellent in transparency, optical isotropic property, gas barrier property, adhesion between layers and surface smoothness and flatness of conductive layer at a high productivity.

Example 6

On the both sides of a polycarbonate sheet as used in Example 1, a metal oxide layer as in Example 5 was formed.

On the metal oxide layer on the belt side of the sheet, a first anchor coat layer of a silicon compound layer as in Example 1 was formed to a thickness of 25 nm.

On this first anchor coat layer, there were formed a second anchor coat layer 1 µm thick, a polyvinyl alcohol-based resin layer 5 µm thick, a third anchor coat layer 1 µm thick, and an outermost solvent-resistant layer 4 µm thick. These layers were the same as those on the air side in Example 3 except that the thickness of the polyvinyl alcohol-based resin layer was changed.

Subsequently, on the metal oxide layer on the air side formed was a fourth anchor layer of a silicon compound as used in Example 1. The thickness of the layer was 25 nm.

On the fourth anchor layer, there were formed a fifth anchor layer of a phenoxy-based curd resin layer as used on the polyvinyl alcohol-based resin layer in Example 3, and then an outermost solvent-resistant layer of an ultraviolet curable resin, which was the same as the outermost solvent-resistant layer on the belt side. The thickness of the fifth anchor layer was 1 µm and that of the outermost solvent-resistant layer was 4 µm.

In this lamination construction, the time periods for forming respective layers are very short and the productivity was high.

The various properties of the thus manufactured laminated sheet were evaluated to have light transmittances of 89% at wavelength of 550 nm and 87% at wavelength of 400 nm, a haze value of 0.6%, and a retardation value of 8±2 nm and a slow axis deviation of ±8 degrees as the MD direction as the center, measured at arbitrary 10 points. The surface roughness Ra of the laminated sheet was 4.9 nm on the air side and 48 nm on the belt side.

The oxygen permeability of this laminated sheet was 0.05 $cc/m^2$·day·atm at 30° C., 50% RH and 2 $cc/m^2$·day·atm at 30° C., 90% RH. The water vapor permeability was 1 $g/m^2$·day·atm at 40° C., 90% RH. No changes were found in the sheet during evaluation of the solvent resistance including the tests for resistances to etching, alkali and organic solvent. The adhesion test for both sides of the laminated sheet was conducted and no release was seen.

The thus obtained transparent conductive sheet had a light transmittance of 85% at wavelength of 550 nm. The haze value was 0.9%. The surface roughness Ra of the transparent conductive layer was 4.9 nm. After durability test kept at 60° and 90% RH for 250 hours, the transparent conductive sheet had no changes in appearance and the adhesion test for both sides of the sheet resulted in no release.

It was possible to obtain a transparent conductive sheet excellent in transparency, optical isotropic property, gas barrier property, adhesion between layers and surface smoothness and flatness of conductive layer at a high productivity.

Reference Example 1

A laminated sheet without an organic silicon compound-containing anchor coat layer was prepared by the same method as in Example 1, but omitting the anchor coat made from the organic silicon compound in Example 1. When the adhesion between the layers of this laminated sheet was evaluated, peeling readily occurred between the $SiO_x$ and ultraviolet curing resin layers. Thus, the laminated sheet had inferior adhesion.

Reference Example 2

A laminated sheet was prepared with the same construction as obtained by the method as in Example 1, but without addition of the acrylisocyanate to the ultraviolet curing resin as in Example 1. When the adhesion between the layers of this laminated sheet was evaluated, peeling readily occurred between the organic silicon compound anchor coat and ultraviolet curing resin layers. Thus, the laminated sheet had inferior adhesion.

Reference Example 3

A laminated sheet with a thermosetting epoxy resin as the outermost layer was prepared by the same method as in Example 1, except that instead of the ultraviolet curing resin layer in Example 1, the outermost layer was a layer formed using a Mayer bar to coat the anchor coat layer with a solution prepared by uniformly mixing 74 parts of methyl-hexahydrophthalic anhydride and 5 parts of 1,8-diazabicyclo (5,4,0)undecane with a mixed solution of 100 parts of a cresol/novolac-type epoxy resin (EOCN-104S, product of Nihon Kayaku, KK.) and 100 parts of methyl isobutyl ketone, and then heating this at 100° C. for 3 minutes and further at 135° C. for 60 minutes. When the adhesion between the layers of this laminated sheet was evaluated, peeling readily occurred between the organic silicon compound anchor coat and ultraviolet curing resin layers. Thus, the laminated sheet had inferior adhesion.

Reference Example 4

A laminated sheet was prepared with the same construction as obtained by the method as in Example 1, but adding the acrylisocyanate in Example 1 in an amount of 3 parts. When this laminated sheet was subjected to moist heat durability testing, peeling occurred between the $SiO_x$ and ultraviolet curing resin layers after 100 hours had passed. Thus, the laminated sheet had inferior adhesion.

Reference Example 5

A laminated sheet was prepared with the same construction as obtained by the method as in Example 1, but adding the acrylisocyanate in Example 1 in an amount of 30 parts. When the solvent resistance of this laminated sheet was evaluated by an alkali resistance test, slight whitening occurred in the ultraviolet curing resin layer. Thus, the laminated sheet had inferior solvent resistance.

Reference Example 6

A laminated sheet was prepared with the same construction as obtained by the method as in Example 1, but the average composition of the silicon oxide layer was $SiO_x$ wherein x is 1.4.

This laminated sheet had a light transmittance of 85% at wavelength of 550 nm and 78% at wavelength of 400 nm. The transparency was low.

Reference Example 7

A laminated sheet was prepared with the same construction as obtained by the method as in Example 4, but omitting the silicon compound layer and the anchor coat layer on the belt side and forming the polyvinylalcohol-based resin layer directly on the metal oxide layer.

The result of the adhesion test for this laminated sheet was 100/100 and the adhesion was sufficient. However, as a high reliability test, the laminated sheet was subjected to humid heat for 100 hours followed by the adhesion test. The result was 0/100 of the adhesion.

Reference Example 8

A laminated sheet was prepared with the same construction as obtained by the method as in Example 2, but omitting the silicon compound layer on the air side and forming the phenoxy-based cured resin layer, which was the same as the solvent-resistant layer on the belt side, directly on the metal oxide layer.

The result of the adhesion test of this laminated sheet was 100/100 and it was sufficient. However, as a high reliability test, the laminated sheet was subjected to humidity and heat for 100 hours followed by the adhesion test. The result was 0/100.

Example 7

A polycarbonate sheet was prepared in the same method as in Example 1.

A silicon oxide layer with a thickness of 25 nm and an average composition $SiO_x$ wherein x was about 1.7 was then formed on the air side of this polycarbonate sheet by vacuum vapor deposition in a vacuum of 6.7 mPa, using SiO as the vapor source. The silicon oxide layer was then subjected to corona treatment with a cumulative energy of 600 mJ/cm².

On a solvent-resistant layer on the belt side, the same solvent-resistant layer on the belt side used in Example 1 was formed.

Next, the following solvent-resistant layer 4 μm thick was laminated on the silicon oxide layer on the air side.

That is, 148 parts by weight of vinyltrimethoxysilane (KBM1003, tradename of Shinetsu Chemical Co.) was placed in a stirring container the exterior of which was water-cooled, 54 parts of 0.01 N hydrochloric acid water was slowly added while vigorously stirring, and then stirring was continued slowly for 3 hours to obtain a vinyltrimethoxysilane hydrolysate solution.

A coating solution was then prepared by mixing 50 parts by weight of acrylic resin represented by the following formula (10)

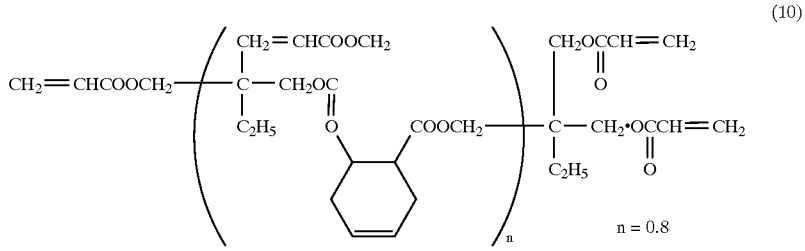

100 parts by weight of the above-mentioned vinyltrimethoxysilane hydrolysate solution, 10 parts by weight of non-hydrolyzed vinyltrimethoxysilane, 8 parts by weight of the photoinitiator 2-hydroxy-2-methyl-1-phenylpropane-1-one (Darocure-1173, tradename of Merck Co.) and 0.02 part by weight of silicone oil (SH28PA, product of Toray/Dow Corning Silicone Co.) as a levelling agent. A bar coater was used to coat this coating solution on the silicon oxide layer, and after heating at 60° C. for 1 minute to evaporate off the residual solvent in the coated layer, it was exposed to ultraviolet rays with a 160 W/cm high-pressure mercury lamp and a cumulative light amount of 800 mJ/cm$^2$ to cure the coated layer. The surface roughnesses Ra of the sheet were 4.6 nm on the air side and 7.8 nm on the belt side.

The light transmittance of the laminated sheet obtained in this manner was 88% at a wavelength of 550 nm and 82% at a wavelength of 400 nm. The haze value was 0.4%. When measured at 10 arbitrary points on the sheet, the retardation value was 8±2 nm and the slow axis was within ±8 degrees with the MD direction as the center. The surface roughness Ra was 4.6 nm on the air side and 7.8 nm on the belt side.

Adhesion testing of the laminated sheet obtained in this manner gave results of 100/100. In addition, adhesion testing after 250 hours of durability testing at 60° C., 90% RH and 90° C., DRY also gave results of 100/100, showing no deterioration in the adhesion.

Furthermore, when the laminated sheet was subjected to solvent resistance testing to determine its acid solution resistance, alkali solution resistance and organic solvent resistance, no changes in appearance were observed, demonstrating excellent solvent resistance.

In addition, when the oxygen permeability of the laminated sheet was measured, low values of 6 cc/m$^2$·day·atm under measuring conditions of 30° C., 50% RH and 7 cc/m$^2$·day·at munder measuring conditions of 30° C., 90% RH were exhibited, irrespective of the environmental humidity. Also, when the water vapor permeability was measured, a low value of 3 g/m$^2$·day·atm was exhibited under measuring conditions of 40° C., 90% RH.

Next, an indium-tin oxide layer was formed by sputtering as a transparent conductive layer on the side of the laminated sheet on which the metal oxide layer and solvent resistance layer had been laminated, to form a transparent conductive film. The sputtering target was an indium-tin oxide target having a composition with an indium/tin weight ratio of 9:1, and a packing density of 90%. The sheet was set in a sputtering apparatus which was then evacuated to a pressure of 1.3 mPa, and then a mixed gas with an Ar/O$_2$ volume mixing ratio of 98.5/1.5 was introduced to adjust the atmosphere pressure to 0.27 Pa. The sheet temperature was set to 50° C., and DC sputtering was performed at a making current density of 1 W/cm$^2$. The resultant transparent conductive layer had a 0% relative area of resident crystal grains, and was thus amorphous. The film thickness was 130 nm, and the surface resistance value was 40 Ω/□.

The light transmittance of the transparent conductive sheet at a wavelength of 550 nm was 84%, and the haze value was 0.4%. By measuring at 10 arbitrary points on the sheet, the retardation value was 8±2 nm and the slow axis was within ±8 degrees with the MD direction as the center. The surface roughness Ra of the transparent conductive layer surface was 4.6 nm. The results of adhesion testing were 100/100, demonstrating satisfactory adhesion of the transparent conductive layer.

As shown above, this transparent conductive sheet had excellent transparency, optical isotropy, gas barrier properties, solvent resistance, surface smoothness, adhesion and durable reliability.

Reference Example 9

A transparent conductive sheet was prepared in exactly the same manner as in Example 7, except that the composition used as the resin composition for the solvent-resistant layer was the one described below, lacking the alkoxysilane hydrolysate in the resin composition of Example 7.

As the coating solution for forming the solvent-resistant layer there was used a mixture of 100 parts by weight of the acrylic resin as used in Example 7, 7 parts by weight of the photoinitiator 2-hydroxy-2-methyl-1-phenylpropane-1-one (Darocure-1173, tradename of Merck Co.) and 0.02 part by weight of silicone oil (SH28PA, product of Toray-Dow Corning Silicone Co.). A bar coater was used to coat this coating solution on the silicon oxide layer, and after heating at 60° C. for 1 minute to evaporate off the residual solvent in the coated layer, it was exposed to ultraviolet rays with a 160 W/cm high-pressure mercury lamp and a cumulative light amount of 700 mJ/cm$^2$ to cure the coated layer, and form a solvent-resistant layer.

When the laminated sheet was subjected to solvent resistance testing to determine its acid solution resistance, alkali solution resistance and organic solvent resistance, no changes in appearance were observed, demonstrating excellent solvent resistance. However, the results of adhesion testing were 0/100, and because of poor adhesion between the silicon oxide layer and solvent-resistant layer, the sheet was not suitable for use.

Reference Example 10

A transparent conductive sheet was prepared in exactly the same manner as in Example 7, except that the following epoxy-based curing resin layer was used as the resin composition for the solvent-resistant layer.

The epoxy-based curing resin layer used as the solvent-resistant layer was prepared in the following manner.

A Mayer bar was used to coat the metal oxide layer with a coating solution comprising 100 parts by weight of a cresol/novolac-type epoxy resin (EOCN-104S, product of Nihon Kayaku, KK.), 20 parts by weight of γ-glycidoxypropyltrimethoxysilane, 150 parts by weight of methyl isobutyl ketone, 80 parts by weight of methylhexahydrophthalic anhydride and 5 parts by weight of 1,8-diazabicyclo(5,4,0)undecene, and this was then heated at 130° C. for 30 minutes to form a layer.

When the laminated sheet was subjected to solvent resistance testing to determine its acid solution resistance, alkali solution resistance and organic solvent resistance, no changes in appearance were observed, demonstrating excellent solvent resistance. Adhesion testing at the beginning of lamination gave results of 100/100. However, adhesion testing repeated after 100 hours of durability testing at 60° C., 90% RH gave results of 0/100, demonstrating deterioration in the adhesion between the silicon oxide layer and the solvent-resistant layer. That is, the durable reliability of adhesion between the layers was low, making the sheet unsuitable for use.

Example 8

This Example was similar to Example 2 except the following.

A polyvinyl alcohol-based resin layer 6μm thick was laminated by Mayer bar coating in the following manner.

The polyvinyl alcohol-based resin layer was formed by coating the anchor coat layer with a coating solution prepared as a heated mixture of 15 parts of the ethylene-vinyl alcohol copolymer EP-F101 manufactured by Kuraray, KK. (ethylene content: 32 mole percent), 50 parts of water as the solvent and 35 parts of n-propyl alcohol, and heating it at 110° C. for 30 minutes.

The transparency was sufficient, with a light transmittance of the laminated sheet of 89% at a wavelength of 550 nm and a haze value of 0.4%, and thus the transparency of the substrate sheet was approximately maintained.

Measurement of the adhesion between the polycarbonate sheet and polyvinyl alcohol-based resin layer of this laminated sheet gave 100/100, demonstrating satisfactory adhesion.

After long-term reliability testing at 90° C. for 1000 hours, there were absolutely no problems in the adhesion test.

Example 9

In the procedure of Example 2, a 2 μm-thick anchor coat layer for a polyvinyl alcohol-based resin layer was formed by Mayer bar coating in the following manner.

The anchor coat layer was a phenoxy ester resin, and specifically, 20 parts of the phenoxy ester resin PKHM-30, manufactured by Union Carbide Corp., was mixed with 40 parts of methyl ethyl ketone and 20 parts of 2-ethoxyethyl acetate as solvents, and then 20 parts of Coronate L, manufactured by Nihon Polyurethane, KK. as a polyfunctional isocyanate was mixed therewith to prepare a coating solution. The ratio of NCO/OH was 1.4. One side of the optically isotropic plastic sheet was coated with this coating solution and heated at 80° C. for 5 minutes and at 130° C. for 10 minutes to form an anchor coat layer. The surface of this anchor coat layer was completely tack-free.

The light transmittance of the laminated sheet was 90% at a wavelength of 550 nm and the haze value was 0.3%, thus demonstrating adequate transparency.

Measurement of the adhesion between the polycarbonate sheet and polyvinyl alcohol-based resin layer of this laminated sheet gave 100/100, demonstrating satisfactory adhesion.

After long-term reliability testing at 90° C. for 1000 hours, there were absolutely no problems in the adhesion.

Example 10

A laminated sheet with the same construction as Example 2 was formed except that the anchor coat under, the polyvinyl alcohol-based resin layer of Example 2 had the composition described below.

The phenoxy resin composition of the anchor coat layer was a composition prepared by adding 5 parts of a polyfunctional isocyanate to a mixture of 20 parts of the phenoxy resin, 40 parts of methyl ethyl ketone and 20 parts of 2-ethoxyethyl acetate. The ratio of NCO/OH was 0.25. The surface of the formed anchor coat layer was completely tack-free under the same heat treatment conditions as in Example 9.

The light transmittance of the laminated sheet was 90% at a wavelength of 550 nm and the haze value was 0.3%, thus demonstrating the same transparency as obtained in Example 2.

Measurement of the adhesion between the polycarbonate sheet and polyvinyl alcohol-based resin layer of this laminated sheet gave 100/100, demonstrating satisfactory adhesion.

After long-term reliability testing at 90° C. for 1000 hours, there were absolutely no problems in the adhesion.

Example 11

A laminated sheet with the same construction as Example 2 was formed except that the anchor coat layer under the polyvinyl alcohol-based resin layer of Example 2 had the composition described below.

The phenoxy resin composition of the anchor coat layer was a composition prepared by adding 58 parts of a polyfunctional isocyanate to a mixture of 20 parts of the phenoxy resin, 40 parts of methyl ethyl ketone and 20 parts of 2-ethoxyethyl acetate. The ratio of NCO/OH was 2.9. The surface of the formed anchor coat layer was completely tack-free under the same heat treatment conditions as in Example 2.

The light transmittance of the laminated sheet was 90% at a wavelength of and the haze value was 0.3%, demonstrating the same transparency as obtained in Example 2.

Measurement of the adhesion between the polycarbonate sheet and polyvinyl alcohol-based resin layer of this laminated sheet gave 100/100, demonstrating satisfactory adhesion.

After long-term reliability testing at 90° C. for 1000 hours, there were absolutely no problems in the adhesion.

Example 12

A laminated sheet with the same construction as Example 2 was formed except that the heat treatment conditions for the anchor coat layer of Example 2 were changed.

The heat treatment conditions were set by studying the minimum time required to obtain a tack-free surface with practically no hindrance, and especially no adhesion, when folded onto itself or wound on a roll. This construction made it possible to form an anchor coat layer with a tack-free surface with practically no hindrance after heat treatment at 130° C. for as little as 5 minutes.

The light transmittance of the laminated sheet was 90% at a wavelength of 550 nm and the haze value was 0.3%, thus demonstrating the same transparency as obtained in Example 7.

Measurement of the adhesion between the polycarbonate sheet and polyvinyl alcohol-based resin layer of this laminated sheet gave 100/100, demonstrating satisfactory adhesion.

After long-term reliability testing at 90° C. for 1000 hours, there were absolutely no problems in the adhesion.

Reference Example 11

A laminated sheet with the same construction as Example 2 was formed except that the anchor coat layer under the polyvinyl alcohol-based resin layer of Example 2 had the composition described below.

The anchor coat layer was a polyurethane resin, and the coating solution was prepared by mixing 25 parts of the polyfunctional isocyanate compound A3 manufactured by Takeda Yakuhin Kogyo, KK. as a curing agent with 100 parts of A310 manufactured by Takeda Yakuhin Kogyo, KK. as the main polyol component. This coating solution was coated on one side of the polycarbonate sheet, and heated at 100° C. for 25 minutes to form an anchor coat layer.

The surface of this anchor coat layer was tacky, and when the laminated sheet was folded together after forming only the anchor coat layer, it adhered to itself. Furthermore, when the laminated sheet which had adhered to itself was peeled apart, the surface of the anchor coat layer was roughened.

The same type of polyvinyl alcohol-based resin layer as in Example 2 was formed on this tacky anchor coat surface by Mayer bar coating. Because of the tackiness of the surface, the Mayer bar did not glide satisfactorily, making it impossible to form a layer with a uniform thickness.

The light transmittance of this laminated sheet was 85% at a wavelength of 550 nm and the haze value was 7.2%, thus demonstrating greatly reduced transparency.

Reference Example 12

A laminated sheet with a polyvinyl alcohol-based resin layer was prepared by direct lamination of a polycarbonate sheet with a polyvinyl alcohol-based resin sheet.

The polyvinyl alcohol-based resin sheet was formed by casting onto a 175 $\mu$m-thick polyester sheet by Mayer bar coating and releasing after drying. The polyvinyl alcohol-based resin layer was made of polyvinyl alcohol, using a heated mixture of 15 parts of PVA-117 manufactured by Kuraray, KK. and 85 parts of water as the solvent, and heating the solution at 110° C. for 30 minutes. The thickness of the polyvinyl alcohol-based resin sheet was 8 $\mu$m.

On the laminated sheet comprising the polycarbonate sheet and the phenoxy-based resin anchor layer thereon, which was prepared in the same manner as in Example 2, the above polyvinyl alcohol-based resin sheet was pasted by direct lamination on the anchor coat layer side, and the laminated sheet was heated at 130° C. for 30 minutes.

The laminated sheet obtained in this manner had defects such as wrinkles and air bubbles, and it was difficult to prepare a uniform laminated sheet.

Reference Example 13

A laminated sheet with the same construction as Example 2 was formed except that the anchor coat layer under the polyvinyl alcohol-based resin layer of Example 2 had the composition described below.

The phenoxy resin composition of the anchor coat layer was a composition prepared by adding 2 parts of a poly-functional isocyanate to a mixture of 20 parts of a phenoxy resin, 40 parts of methyl ethyl ketone and 20 parts of 2-ethoxyethyl acetate. The ratio of NCO/OH was 0.1. The rest of the procedure was the same as in Example 2.

Measurement of the adhesion between the polycarbonate sheet and polyvinyl alcohol-based resin layer of this laminated sheet 10/100, demonstrating low adhesion.

Reference Example 14

A laminated sheet with the same construction as Example 2 was formed except that the anchor coat layer for the polyvinyl alcohol-based resin layer of Example 2 had the composition described below.

The phenoxy resin composition of the anchor coat layer was a composition prepared by adding 64 parts of a poly-functional isocyanate to a mixture of 20 parts of the phenoxy resin, 40 parts of methyl ethyl ketone and 20 parts of 2-ethoxyethyl acetate. The ratio of NCO/OH was 3.2. The rest of the procedure was the same as in Example 2.

Measurement of the adhesion between the polycarbonate sheet and polyvinyl alcohol-based resin layer of this laminated sheet gave 0/100, demonstrating poor adhesion.

Example 13

The procedures of Example 4 were repeated except that the solvent-resistant layer on the air side was formed by coating a uniform mixture prepared by dissolving 100 parts by weight of a cresol/novolac-type epoxy resin (EOCN-104S, product of Nihon Kayaku, KK.) in 150 parts by weight of methyl ethyl ketone and adding 27.5 parts by weight of bis(4-amino-3-methyldicyclohexyl) methane and 1 part by weight of γ-glycidoxypropyltrimethoxysilane, heating the coat at 80° C. for 60 minutes and then at 135° C. for 180 minutes.

The resultant transparent laminated sheet had a light transmittance of 88% at a wavelength of 550 nm and no solvent resistance problems, and thus was a transparent laminated sheet with excellent optical characteristics, and solvent resistance.

Example 14

The procedures of Example 4 were repeated except that the solvent-resistant layer was prepared by coating a uniform mixture prepared by dissolving 100 parts by weight of a phenol/novolac-type epoxy resin (EPPN-201, product of Nihon Kayaku, KK.) in 150 parts by weight of methyl ethyl ketone and adding 90 parts by weight of methylhexahydro-phthalic anhydride and 5 parts by weight of 1,8-diazabicyclo (5,4,0)undecane, heating the coat at 100° C. for 3 minutes and then at 135° C. for 60 minutes.

The resultant transparent laminated sheet had a light transmittance of 88% at a wavelength of 550 nm and no solvent resistance problems, and thus was a transparent laminated sheet with excellent optical characteristics and solvent resistance.

Example 15

The procedures of Example 4 were repeated except that the solvent-resistant layer on the air side was formed by using a silicon-based curing resin coating solution prepared by combining 18 g of γ-aminopropyltrimethoxysilane, 14.8 g of methyl trimethoxysilane, 2.6 g of dimethyl dimethoxysilane and 11.5 g of 0.01 N hydrochloric acid and stirring the mixture for 3 hours while maintaining a temperature of 20° C. This coating solution was then heated at 135° C. for 10 minutes. The thickness of each protective layer was 3.5 $\mu$m.

The resultant transparent laminated sheet had a light transmittance of 88% at a wavelength of 550 nm and no solvent resistance problems, and thus was a transparent laminated sheet with excellent optical characteristics and solvent resistance.

Example 16

A polycarbonate resin with an average molecular weight of 37,000, of which the bisphenol component consisted solely of bisphenol A, was used to form a polycarbonate sheet by solution casting in the following manner.

The polycarbonate resin was dissolved in a methylene chloride solvent to a concentration of 20 wt %, and the resulting solution was cast onto a 175 $\mu$m-thick polyester sheet by die coating to form a plastic sheet. After a drying step in which the solvent was vaporized off until the residual solvent concentration reached 13 wt %, the polycarbonate sheet was released from the polyester sheet. The resultant polycarbonate sheet was then placed in a drying oven at a temperature of 120° C. and dried to a residual solvent concentration of 0.08 wt % while balancing the lengthwise and widthwise tension.

The thus obtained sheet had a thickness of 102 $\mu$m. The surface roughness Ra was 0.5 nm on the air side and 2.1 nm on the belt side.

On the belt side of the polycarbonate sheet formed was an anchor coat layer with a thickness of 2 $\mu$m by Mayer bar coating method as below.

The anchor layer was formed of a phenoxy resin, and specifically, it was formed by mixing 40 parts of the phenoxy resin Phenotohto YP-50, manufactured by Tohto Chemical, K.K. with 40 parts of methyl ethyl ketone and 20 parts of 2-ethoxyethyl acetate, and then mixing this with 20 parts of Coronate L, manufactured by Nihon Polyurethane, KK. as a polyfunctional isocyanate curing agent to prepare a coating solution which was then coated and heated at 80° C. for 5 minutes and at 130° C. for 3 hours. The obtained anchor coat layer was completely tack free on its surface.

On the anchor coat layer laminated was a polyvinyl alcohol-based resin layer with a thickness of 6 μm by Mayer bar coating method as below.

The polyvinyl alcohol-based resin layer was formed by coating a coating solution of a mixture of 15 parts of polyvinyl alcohol PVA-117, product of Kuraray K.K. and 85 parts of water as a solvent on the anchor layer and heat treating the coated layer at 110° C. for 30 minutes.

On the both sides of the thus obtained plastic sheet, a solvent-resistant layer 8 μm thick was formed. The solvent-resistant layer was of a phenoxy resin and formed by mixing 40 parts of phenoxy resin. Phenotohto YP-50, product of Tohto Chemical K.K., with 40 parts of methyl ethyl ketone and 20 parts of 2-ethoxyethyl acetate, and then mixing this with 40 parts of Coronate L, product by Nippon Polyurethane K.K., as a polyfunctional isocyanate curing agent to prepare a coating solution, which was then coated and heated at 80° C. for 5 minutes and then at 130° C. for 3 hours.

The various properties of the thus obtained laminated sheet were evaluated to have light transmittances of 90% at a wavelength of 550 nm and 89% at a wavelength of 400 nm, a haze value of 0.3%, and a retardation value of 8±2 nm and a slow axis deviation of ±9 degrees with the MD direction as the center, measured at 10 arbitrary points. The surface roughness Ra was 3.6 nm on the air side and 13.4 nm on the belt side.

The oxygen permeability of this laminated sheet was 0.05 cc/m$^2$·day·atm at 30° C., 50% RH. The water vapor permeability was 18 g/m$^2$·day·atm at 40° C., 90% RH. No changes were found in the sheet during evaluation of the solvent resistance. In the moist heat durability test, there were no apparent changes even after 500 hours had passed, and there was absolutely no peeling between the layers. The scratch resistance was also satisfactory.

A transparent conductive layer was formed on the above solvent-resistant layer of the laminated sheet.

The transparent conductive layer was an indium-tin oxide layer formed by the following sputtering method.

The sputtering target used was an indium-tin oxide target with a composition of indium/tin=90/10 in terms of weight ratio and a packing density of 90%. The sheet was set in a sputtering apparatus which was then evacuated to a pressure of 1.3 mPa, and then an Ar/O$_2$ gas with a volume mixing ratio of 98.5/1.5 was introduced to adjust the atmosphere pressure to 0.27 Pa. The sheet temperature was set to 50° C., and DC sputtering was performed at a making current density of 1 W/cm$^2$.

The resultant transparent conductive layer had a 0% relative area of resident crystal grains, and was thus amorphous. The film thickness was 130 nm, and the surface resistance value was 40 Ω/□.

The light transmittance of the transparent conductive sheet obtained in this manner was 85% at a wavelength of 550 nm. The haze value was 0.5%. The transparent conductive layer surface had an Ra of 3.8 nm.

We claim:

1. A transparent conductive sheet comprising:
   i) a plastic substrate having a first and second side,
   ii) a gas barrier layer of a metal oxide layer on or above said plastic substrate on said first side thereof
   iii) an organosilicon-containing layer on and adhered to said gas barrier layer, said organosilicon-containing layer being a cured layer of a resin composition comprising:
      a) a radiation curable resin, and
      b) a hydrolysate of at least one alkoxysilane represented by formula (1) or formula (2), or a mixture thereof:

$$R^1\text{---Si}(OR^2)_3 \tag{1}$$

$$Si(OR^2)_4 \tag{2}$$

wherein R$^1$ is a methyl group, an ethyl group or an organic group containing at least one group selected from the group consisting of a vinyl group, an acryloyl group, a methacryloyl group, and wherein R$^2$ is a methyl group or an ethyl group, and iv) a transparent electrically conductive layer as an outermost layer on either said first side or said second side of said plastic substrate.

2. The transparent conductive sheet according to claim 1, wherein said organosilicon-containing layer has a thickness sufficient to allow said organosilicon containing layer to serve as a solvent-resistant layer.

3. The transparent conductive sheet according to claim 1 further comprising a solvent-resistant layer on or above an outer side of said organosilicon-containing layer wherein said organosilicon-containing layer serves as an intervening layer that promotes adhesion of said gas barrier layer with a solvent resistant layer.

4. The transparent conductive sheet according to claim 1, wherein said resin composition comprises said radiation curable resin and said hydrolysate in a solid weight ratio of 20:1 to 1:3.

5. The transparent conductive sheet according to claim 1, wherein said alkoxysilane is selected from the group consisting of vinyltrimethoxysilane, vinyltriethoxysilane, γ-acryloxypropyltrimethoxysilane, γ-methacryloxypropyltrimethoxysilane, methyltrimethoxysilane, methyltriethoxysilane, γ-aminopropyltriethoxysilane and γ-glycidoxypropyltrimethoxysilane.

6. The transparent conductive sheet according to claim 5, wherein said alkoxysilane is selected from the group consisting of vinyltrimethoxysilane, vinyltriethoxysilane, and γ-acryloxypropyltrimethoxysilane.

7. The transparent conductive sheet according to claim 2, wherein said radiation curable resin comprises a polyfunctional acrylate.

8. The transparent conductive sheet according to claim 6, wherein said acrylate is represented by formula (8):

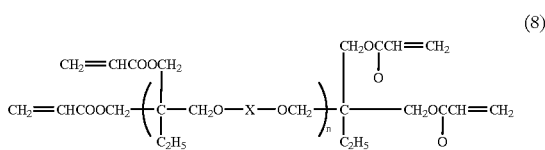

(8)

wherein X is a divalent group represented by:

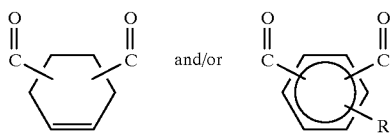

wherein R is a hydrogen atom, a halogen atom, a methyl group, or an ethyl group; and n is a number in a range of 0.5 to 2 as an average.

9. The transparent conductive sheet according to claim 7, wherein the radiation curable resin contains at least 50% of an aliphatic polyfunctional acrylic resin with at least two acryl groups per molecule, based on the total weight of the resin.

10. The transparent conductive sheet according to claim 1, further comprising a gas barrier layer of a polyvinylalcohol resin layer, wherein said metal oxide layer and polyvinylalcohol resin layer are present on the same side of said plastic substrate, and wherein said polyvinylalcohol resin layer is present on an outer side of said metal oxide layer.

11. The transparent conductive sheet according to claim 1, further comprising a gas barrier layer of a polyvinylalcohol resin layer, wherein said metal oxide layer and said polyvinylalcohol resin layer are present on opposite sides of said plastic substrate.

12. The transparent conductive sheet according to claim 1, wherein said organosilicon-containing layer is a cured layer of resin composition comprising:

(a) a radiation curable resin, comprising a polyfunctional acrylate represented by formula (8):

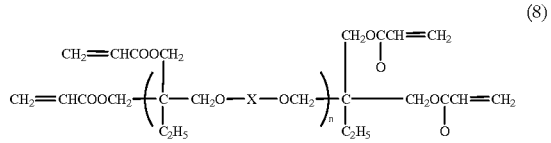

wherein X is a divalent group represented by:

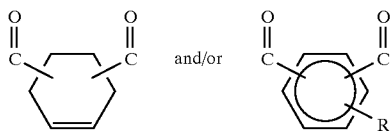

wherein R is a hydrogen atom, a halogen atom, a methyl group, or an ethyl group; and n is a number in a range of 0.5 to 2 as an average, and (b) a hydrolysate of a least one alkoxysilane represented by formula (1) or formula (2), or a mixture thereof:

wherein $R^1$ is a methyl group; or an organic group containing a vinyl group, an acryloyl group, a methacryloyl group, an amino group or epoxy group, and wherein $R^2$ is methyl group or an ethyl group.

13. The transparent conductive sheet according to claim 1, wherein the radiation curable resin contains an acryloyl or methacryloyl group.

14. A transparent conductive sheet comprising
a plastic substrate having a first and second side,
a first gas barrier layer of a polyvinylalcohol resin layer on or above said plastic substrate on said first side thereof and
a second gas barrier layer of a metal oxide layer which is present on said first or said second side of said plastic substrate,
a solvent-resistant layer on and contiguous to said first gas barrier layer or said solvent-resistant layer having a second anchor layer interposed between said first gas barrier and said solvent-resistant layer, and
a transparent electrically conductive layer as an outermost layer on either said first side or said second side of said plastic substrate,
wherein a first anchor layer of a cured phenoxy resin is present between said polyvinylalcohol resin layer and said plastic substrate, said cured phenoxy resin layer being contiguous to said polyvinylalcohol resin layer.

15. The transparent conductive sheet according to claim 14,
wherein said first and second gas barrier layers are present on the same side of said plastic substrate, and wherein said first gas barrier layer is on an outer side of said second gas barrier layer.

16. The transparent conductive sheet according to claim 14,
wherein said first and second gas barrier layers are present on opposite sides of said plastic substrate.

17. The transparent conductive sheet according to claim 4, wherein said first anchor layer comprising a cured phenoxy resin is obtained by curing a thermal cross-linking resin consisting of a mixture of:

(a) at least one phenoxy resin comprising repeating units represented by formula (5):

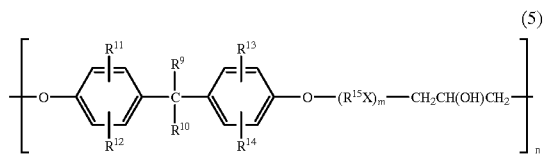

wherein $R^9$, $R^{10}$, $R^{11}$, $R^{12}$, $R^{13}$, and $R^{14}$, are each independently a hydrogen atom, or an alkyl group having from 1–3 carbon atoms,
wherein $R^{15}$ is an alkylene group having from 2–5 carbon atoms,
wherein X is an ether group or an ester group,
wherein m is 0 or an integer of from 1 to 3, and
(b) a polyfunctional isocyanate compound containing at least 2 isocyanate groups.

18. The transparent conductive sheet according to claim 17, wherein said thermal cross-linking resin has a ratio, by number, of isocyanate groups in said polyfunctional isocyanate compound to hydroxy groups in said phenoxy resin, NCO/OH, in a range of 0.2 to 3.

19. The transparent conductive sheet according to claim 17, wherein in formula (5), $R^9$ and $R^{10}$ are each a methyl group; $R^{11}$, $R^{12}$, $R^{13}$ and $R^{14}$, are each a hydrogen atom; and $R^{15}$ is pentylene group.

20. The transparent conductive sheet according to claim 17, wherein said polyfunctional isocyanate compound is selected from the group consisting of 2,6-tolylene diisocyanate, 2,4-tolylene isocyanate, tolylene diisocyanate-trimethylolpropane adduct and hexamethylene diisocyanate.

* * * * *